United States Patent
Holden et al.

(10) Patent No.: US 6,445,705 B1
(45) Date of Patent: Sep. 3, 2002

(54) METHOD FOR A HIGH SPEED COMMUNICATION SYSTEM

(75) Inventors: Brian D. Holden, Sunnyvale, CA (US); Brian D. Alleyne, Walnut Creek, CA (US); Darren S. Braun, Fremont, CA (US); Nadeem Haq, Santa Clara, CA (US); Chee Hu, Fremont, CA (US)

(73) Assignee: PMC-Sierra, Inc., Burnaby (CA)

( * ) Notice: Subject to any disclaimer, the term of this patent is extended or adjusted under 35 U.S.C. 154(b) by 0 days.

(21) Appl. No.: 09/699,075

(22) Filed: Oct. 27, 2000

Related U.S. Application Data

(62) Division of application No. 08/988,940, filed on Dec. 11, 1997, now Pat. No. 6,188,690
(60) Provisional application No. 60/033,029, filed on Dec. 12, 1996.

(51) Int. Cl.[7] ................................................ H04L 12/56
(52) U.S. Cl. .................. 370/394; 370/395.31; 370/412; 340/2.2
(58) Field of Search ................................ 370/388, 355, 370/390–392, 394, 395, 389, 229, 232, 235, 413, 416, 422, 409, 399, 418, 412, 417, 825.79, 395.1, 395.31; 340/825.79, 2.2

(56) References Cited

U.S. PATENT DOCUMENTS

| | | | |
|---|---|---|---|
| 4,630,260 A | | 12/1986 | Toy et al. |
| 5,287,346 A | | 2/1994 | Bianchini, Jr. et al. |
| 5,361,255 A | | 11/1994 | Diaz et al. |
| 5,402,415 A | | 3/1995 | Turner |
| 5,432,784 A | * | 7/1995 | Ozveren ................... 370/60.1 |
| 5,440,549 A | | 8/1995 | Min et al. |
| 5,650,993 A | * | 7/1997 | Lakshman et al. .......... 370/236 |
| 5,703,879 A | | 12/1997 | Proctor et al. |
| 5,724,358 A | * | 3/1998 | Headrick et al. ........... 370/418 |
| 5,859,835 A | | 1/1999 | Varma et al. |
| 5,898,687 A | | 4/1999 | Harriman et al. |
| 5,905,728 A | * | 5/1999 | Han et al. ................... 370/395 |
| 6,188,686 B1 | * | 2/2001 | Smith ......................... 370/388 |

OTHER PUBLICATIONS

PCT Invitation to Pay Additional Fees dated Jun. 3, 1998 (PCT/US 97/22646).

* cited by examiner

*Primary Examiner*—Alpus H. Hsu
*Assistant Examiner*—Duc Ho
(74) *Attorney, Agent, or Firm*—Townsend and Townsend and Crew LLP; Kenneth R. Allen

(57) ABSTRACT

Methods and devices useful in high-speed scalable switching systems include a memoryless switch fabric, per virtual channel queuing, digital phase aligners, randomized and complement connection modes, a mid-point negative acknowledge and output negative acknowledge scheme among other elements. A particular implementation of a routing table and switch element is described in part to illustrate the various techniques and devices of the invention.

3 Claims, 10 Drawing Sheets

Microfiche Appendix Included
(3 Microfiche, 258 Pages)

QSE Interface Block Diagram

System Diagram of Internal QRT Blocks and External RAM

Basic Data Path (SE_DATA and SE_SOC in Forward Path, BP_ACK in Backward Path)

Receive Channel Ring

Receive Channel Ring after Channel_A Becomes Run-Limited

Receive Channel Ring after Channel_B is Served But it Is Not Run-Limited

METHOD FOR A HIGH SPEED COMMUNICATION SYSTEM

CROSS-REFERENCE TO RELATED APPLICATIONS

This application claims priority from provisional patent application No. 60/033,029 (hereinafter the '029 application) filed Dec. 12, 1996 incorporated herein by reference, and is a division of application Ser. No. 08/988,940, filed Dec. 11, 1997, now U.S. Pat. No. 6,188,690. The '029 application includes early data sheets and documentation for specific embodiments of the invention and of related inventions separately described and claimed in related patent co-assigned patent applications MANY DIMENSIONAL CONGESTION DETECTION SYSTEM AND METHOD, filed Nov. 14, 1997, and METHOD AND APPARATUS FOR DETECTING DISABLED PHYSICAL DEVICES AND DELETING UNDELIVERABLE CELLS, filed Nov. 7, 1997.

This application describes improved methods and apparatus for digital communication. Earlier related methods and apparatus are discussed in co-assigned U.S. Pat. No. 5,583,861, filed Apr. 28, 1994, and all divisionals and continuations based thereon including: U.S. patent application Ser. No. 08/680,869, filed Jul. 16, 1996. Collectively, the '861 patent and its divisionals are referred to herein as the '861 patents and are incorporated herein by reference for all purposes.

Other related discussion may be found in co-assigned patent application ASYNCHRONOUS BIT-TABLE CALENDAR FOR ATM SWITCH, which is a continuation of Ser. No. 08/616,875, filed Mar. 15, 1996.

MICROFICHE APPENDIX AND COPYRIGHT NOTICE

A microfiche appendix including 258 frames on three fiche is included herewith. This appendix includes user manuals for two specific integrated circuit devices that incorporate aspects of the invention. A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

This application is further being filed with two paper appendices. Appendix A includes a description of a specific phase aligner utilizing aspects of the invention. Appendix B includes a technical presentation discussing a randomization mode and other aspects of the invention.

FIELD OF THE INVENTION

This invention relates to electronic circuits. More specifically, the invention relates to electronic systems used for digital communications. In specific embodiments, the invention relates to improved methods and systems for routing digital communication data in a paradigm known as Asynchronous Transfer Mode (ATM); however, the invention in some aspects has wide-ranging applications in a number of other data communications environments, and therefore the invention should not be seen as limited except as provided in the attached claims.

BACKGROUND OF THE INVENTION

This invention relates generally to a class of digital communication systems known as asynchronous transfer mode (ATM) switching systems and generally to intercomputer communications and telephony architectures. Although the invention is described herein with reference to specific hardware and software implementations for the purposes of providing a clearer explanation of the invention, it will be apparent to one of ordinary skill in the art that the inventions as described in the attached claims will have application in a variety of different communication environments. An extensive background discussion of ATM technology may be found in the '861 patents and other related patents cited herein.

Increasing demands for communications speed and capacity have created a need for higher performance ATM architectures that are highly scalable and can effectively handle large amounts of multicast and unicast traffic. An increasing variety of communications applications has created a need for ATM components that can be used in a wide variety of different ATM board designs. What is needed are methods and devices for constructing flexible and high performance digital switching systems.

SUMMARY OF THE INVENTION

The present invention in various aspects concerns apparatus and methods for use in communication technology. More specifically, the invention is involved with improvements useful in ATM communications. As is known in the art, many ATM systems are constructed of devices known as switch element (SEs) and routing table (RTs) and may include additional devices. The invention will be described in terms of the operation of SEs and RTs, but aspects of the invention have applications outside of these particular devices and the invention should not be seen as limited except as indicated in the attached claims. For the sake of completeness, specific implementations of an SE and an RT are described in detail. In a specific implementation, a circuit which has a throughput four times greater than a previous generation RTs is referred to as a Quad RT (QRT™); and a switch element having 32 input ports and 32 output ports is referred to as a Quad SE (QSE™). It should be understood, however, that aspects of the invention do not depend on the specific QSE and QRT implementation and may be implemented in communication systems with different architectures. Just a few examples of these include systems wherein each RT is a separate IC device or wherein different numbers of RTs are combined into one IC, or wherein SEs are placed in ICs with more or fewer than 32 input or output ports. Some aspects of the invention will also apply to data systems other than ATM systems and other than systems employing SEs or QRTs as will be seen from the claims. The present invention should therefore be seen as not limited except as indicated by the attached claims including all allowable equivalents.

In particular embodiments, the present invention concerns a new architecture for ATM SEs and RTs. In this new architecture, a memoryless switch fabric architecture is used allowing for alternate path selection. In a specific embodiment, this memoryless mode is used for unicast traffic and a distributed memory mode, such as described in the '861 patents, is used when handling multicast traffic. In one embodiment, an SE in accordance with the invention determines a best path for its multicast traffic and separately determines a best path for its unicast traffic and then a multicast/unicast arbitrator arbitrates between the two solutions to determine which traffic actually flows through the SE.

In one embodiment of the invention, an initial stage device, herein referred to as an RT, uses per virtual channel (VC) queuing of receive buffers to eliminate the well-known head-of-line blocking common in other ATM architectures. A switch fabric further, according to the invention, is able to deliver a per VC ACK/NACK signal to prevent blocking. In an embodiment, furthermore, the switch fabric delivers an MNACK signal letting an RT know whether a blocking condition occurred within the fabric, which is likely not to be present during a next cell cycle, or at the output of the fabric (ONACK), which signals to the RT to not attempt an immediate retransmission.

In unicast mode, an SE according to the present invention performs very fast routing determination for an incoming cell based on the first nibbles in the cell. In each SE, the first several nibbles of a routing header are read and removed from the beginning of the cell header, used to determine a route through the SE, and then appended to the end of the routing header of the cell. Appending the nibbles to the end of the routing header facilitates handling of cells by allowing cells to remain the same length, preserving parity, and speeding routing of the cells by a next stage switch element.

In a further aspect of the invention, SE inputs contain an elastic buffer on each input to allow cells travelling from different distances to be delayed in their arrival time into the SE processing so that cells on all inputs will enter into the SE routing processing at the same time to allow for effective routing and arbitration.

According to the present invention, SE outputs may be aggregated or ganged when multiple outputs are travelling into the same SE in a next stage. In specific embodiments, gangs of 1, 2, 4, 8, 16 or 32 are possible and can be effectively handled by a QSE in unicast mode. Ganging outputs reduces the number of dropped cells in an SE when contention occurs for SE outputs by making those outputs wider.

According to the invention, as discussed above, a specific embodiment of an SE is referred to as a QSE (Quad Switch Element). A particular QSE has 32 nibble-wide (4 bit) inputs and each input includes an acknowledge/backpressure line and a start of cell line, adding up to 6 bit-lines per input. A specific embodiment of a QSE is designed to be used in switch fabrics of up to 64 rows and five columns. In one embodiment, during a single cell cycle, a unicast cell either makes it all the way through the stages of QSEs in the switch fabric to an ORT or it does not and is dropped by the fabric. Cells that are dropped in the fabric are either not acknowledged or are negatively acknowledged back to an IRT and must be resent by the IRT. In one embodiment, a negative acknowledgement for a unicast cell is received by the IRT before the beginning of a next cell cycle, so that an IRT can choose to resend the cell in the immediate next cell cycle. In one embodiment, a mid-switch negative aclmowledgement (MNACK) indicates if a cell is dropped within a switch fabric prior to a deterministic routing point so that the IRT will know if it should immediately resend the cell. A switch fabric output negative acknowledgement (ONACK) indicates if a cell is dropped at a fabric output so that the IRT will know if it should send a different VC's cell.

In a further aspect, a new architecture according to the invention provides for a number of virtual outputs (VOs) for each physical output from an ORT and virtual inputs (VIs) for each physical input to an IRT. A congestion detection system may be deployed in the architecture as described in patents incorporated above. A system for detecting disabled physical devices and deleting undeliverable cells may be deployed-in the architecture as described in patents incorporated above.

DETAILED DESCRIPTION OF SPECIFIC EMBODIMENTS

1. Functional Block Diagram of an ATM System

Figure 1:
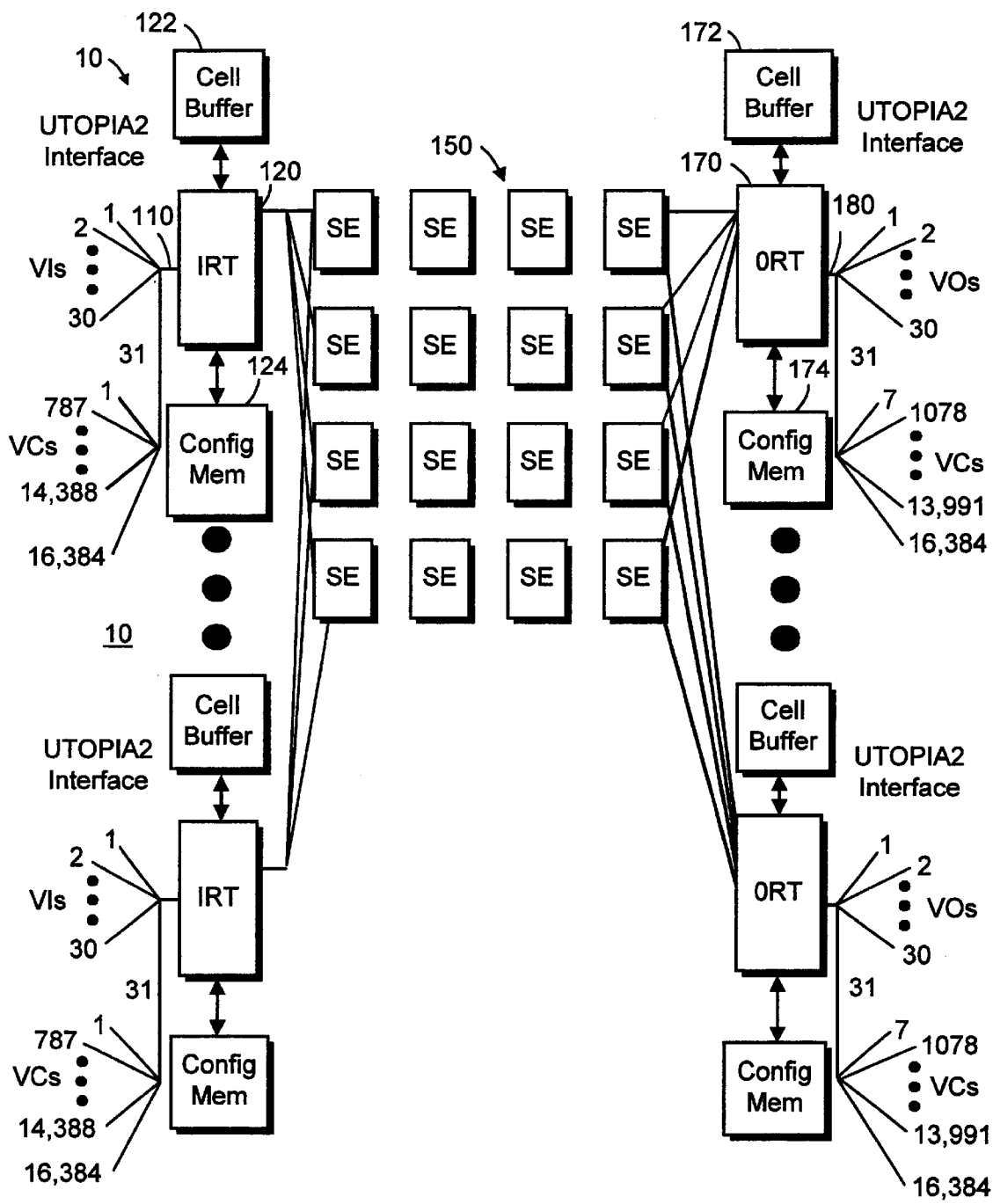
FIG. 1 shows a representation of an ATM network 10 as an example of an ATM architecture using ATM elements including aspects of the invention.

FIG. 1 shows a representation of an ATM network 10 as an example of an ATM architecture using ATM elements including aspects of the invention. ATM network 10 as illustrated contains input transmission line 110, input routing tables (IRTs) 120, a N×N switch matrix 150, output routing tables (ORTs) 170, and output transmission lines 180. Associated with IRT 120 is cell buffer memory 122 and configuration memory 124. Associated with ORT 170 is cell buffer memory 172 and configuration memory 174.

ATM cells, which are digitized packets corresponding to a voice or video signal or a data stream, are sent through an input transmission line 110 into a connecting IRT 120. The IRT 120 ascertains the cell's routing and determines an entry point into the switch matrix path, based on a particular algorithm, including a random-entry algorithm.

Cells are arranged in queues within a buffer memory 122 associated with IRT 120 and are then transmitted through the switch matrix 150. Upon exiting the switch matrix, a cells is sent to one (or possibly more than one in the case of multicast cells) of the N ORTs corresponding to the cell's destination address. Within the ORT 170, received cells are queued in a plurality of queues in cell buffer 172 and subsequently transmitted onto a connecting output transmission line 180. In this manner, an ATM network can route audio, video or data signals, each requiring different bandwidth and transmission speeds.

In order to manage cells flowing through an ATM network, cells are grouped within the RTs into virtual channels (VCs). A VC can be thought of as a sequential stream of cells flowing from a source to a destination, generally representing a single connection such as a single telephone call. The channel is referred to as a virtual channel because there is not generally a dedicated path within the ATM switch from the source to the destination; the actual path may vary from transmission to transmission, or even during transmission, depending upon the type of traffic sent, whether congestion occurs, or other factors.

In the specific embodiment shown, each input transmission line can carry cells from a plurality of virtual inputs (VIs), which number 31 in a specific embodiment. A specific embodiment of an ATM RT can keep track of 16K VCs and a particular VC can occur on any VI. At its simplest, a VC is a stream of cells travelling from a particular VI to a particular VO and having a particular transmission priority. In many ATM switches, cells or VCs are assigned a service class (SC) (sometimes referred to as a priority). The SC defines certain handling within the ATM switch, such as priority of throughput or the amount of available bandwidth that a particular VC is allowed to occupy.

In advanced-ATM networks, cells may also be grouped according to VOs. Supporting VOs allows the cell to be routed to different physical receivers out of the same ORT output line, with data multiplexed to the different output receivers by a device outside of the ORT.

FIG. 1 may be understood to represent a switch constructed of very basic ATM devices or it may be understood to represent various operational blocks of more highly integrated ATM components such as the QSE and QRT described herein.

2. Variety of Configurations of Switch Fabrics

Figure 2:
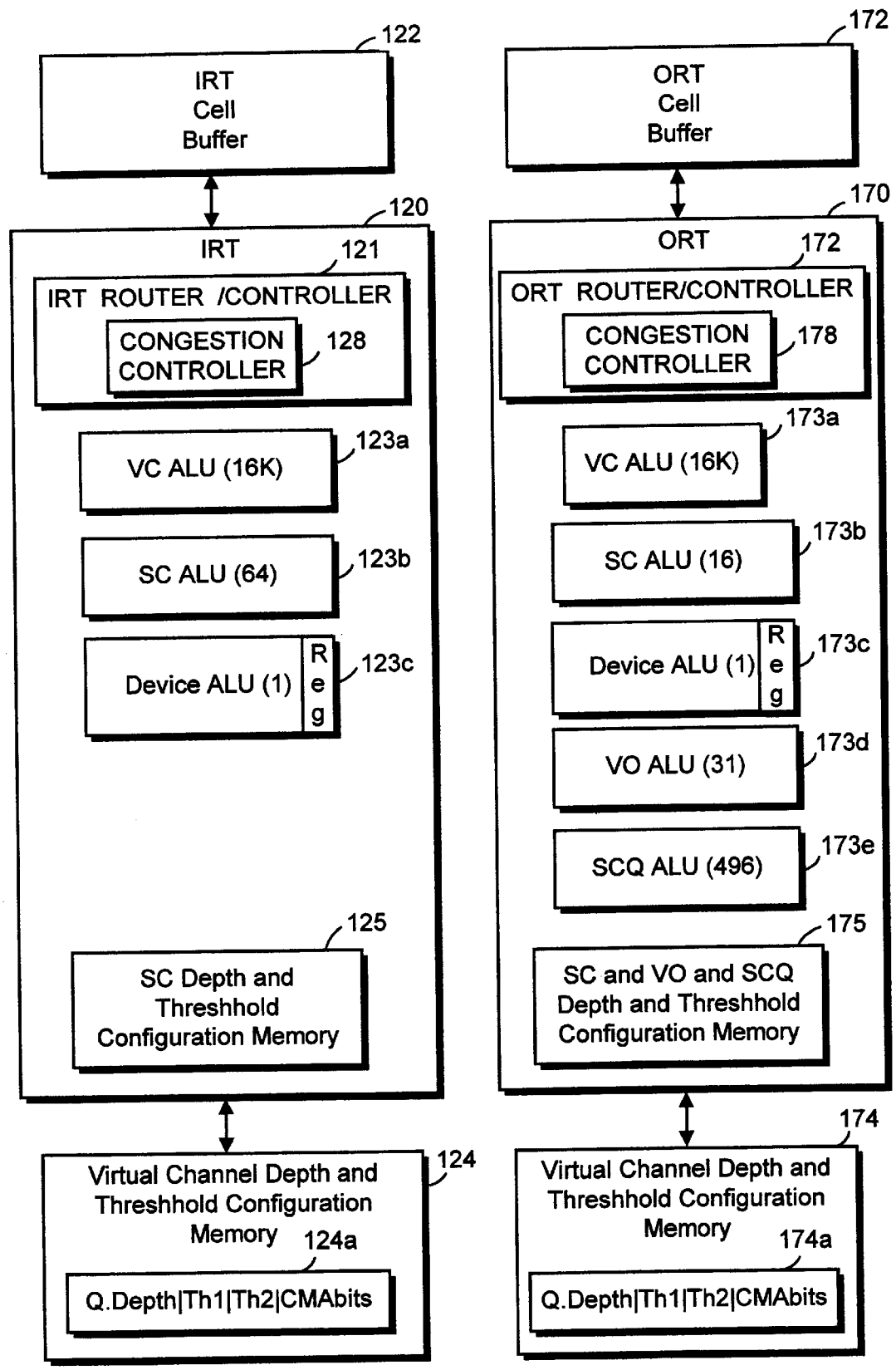
FIG. 2 shows an example of an IRT 120 and ORT 170 in which the invention can be employed.

In one embodiment of the invention, SEs are constructed to have 32 input ports and 32 output ports and are referred to as QSEs. QSEs according to the invention can be assembled into switch fabrics with a variety of configurations. One configuration of a switch fabric is made up of 20 QSEs, arranged in four rows and five columns. As will be explained below, a QSE according to the invention may gang its output ports. Each QSE shown is configured in two gangs of 16 output ports each and can route cells to one of two QSEs in a next stage. Note that the switch fabric in FIG. 2 provides one-way connection between 256 inputs and 256 outputs. In order to route cells in the other directions, a second set of 20 QSEs would be needed.

While a variety of types of switch fabric interconnections are known in the art, in one embodiment unicast cells placed into a switch fabric are not explicitly routed for the first half of the fabric. Cells are instead randomized or otherwise delivered in a non-addressed manner until the middle stage of the fabric is reached. At that point, in fabric designs under discussion, routing through the latter half of the fabric will occur under the same addressing regardless of which SE a cell winds up in the mid-point of the fabric. One specific QSE is limited to a fabric with a maximum of five columns (or stages) and 64 rows, resulting in a switch fabric with 2048 (2K) ATM input lines.

3. Detailed Description of RT

FIG. 2 shows an example of an IRT 120 and ORT 170 in which the invention can be employed A configuration data structure for each VC according to one embodiment is stored in memory 124, which, because of the size necessary to store data structures for 16K virtual channels, may be located in external memory. Data structures are also maintained for each SC, VO, and SCQ. In one embodiment, these data structures are maintained in internal memory 125 and 175, as shown, in order to be more quickly accessible.

Figure 4:
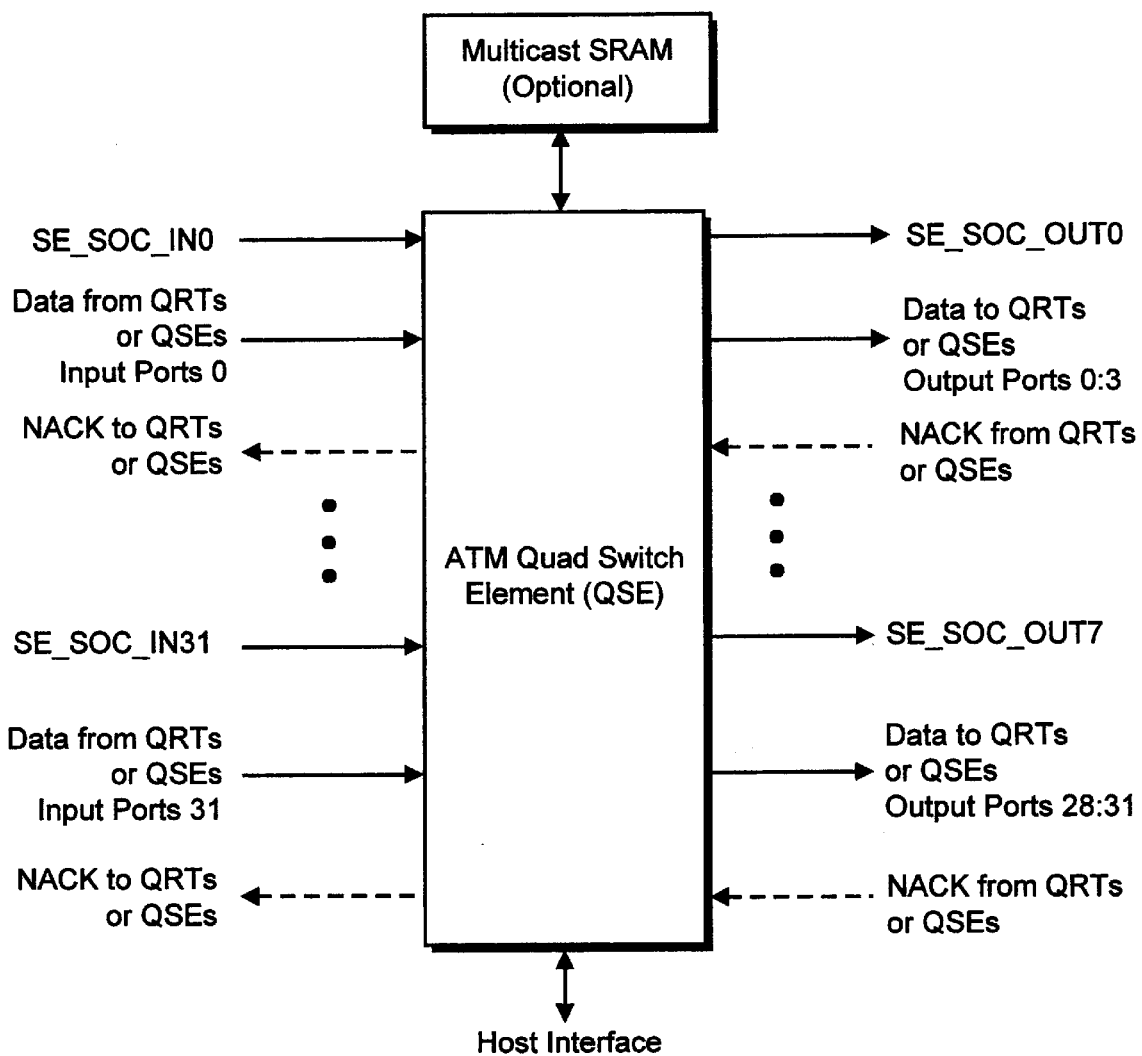
FIG. 4 shows a QSE interface block diagram.
Figure 5:
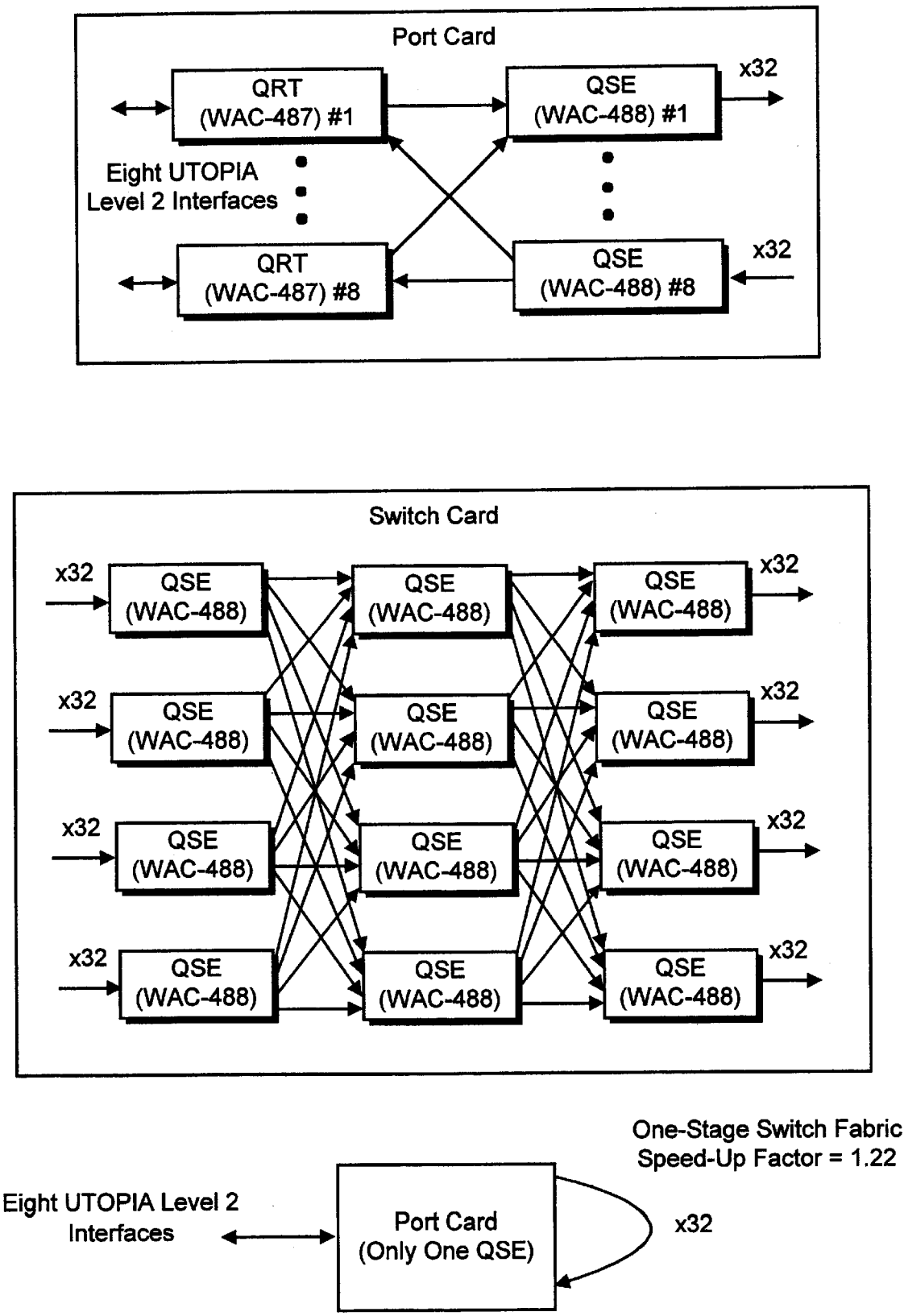
FIG. 5 shows various switching devices that can be constructed with QSEs and QRTs according to the invention.
Figure 6:
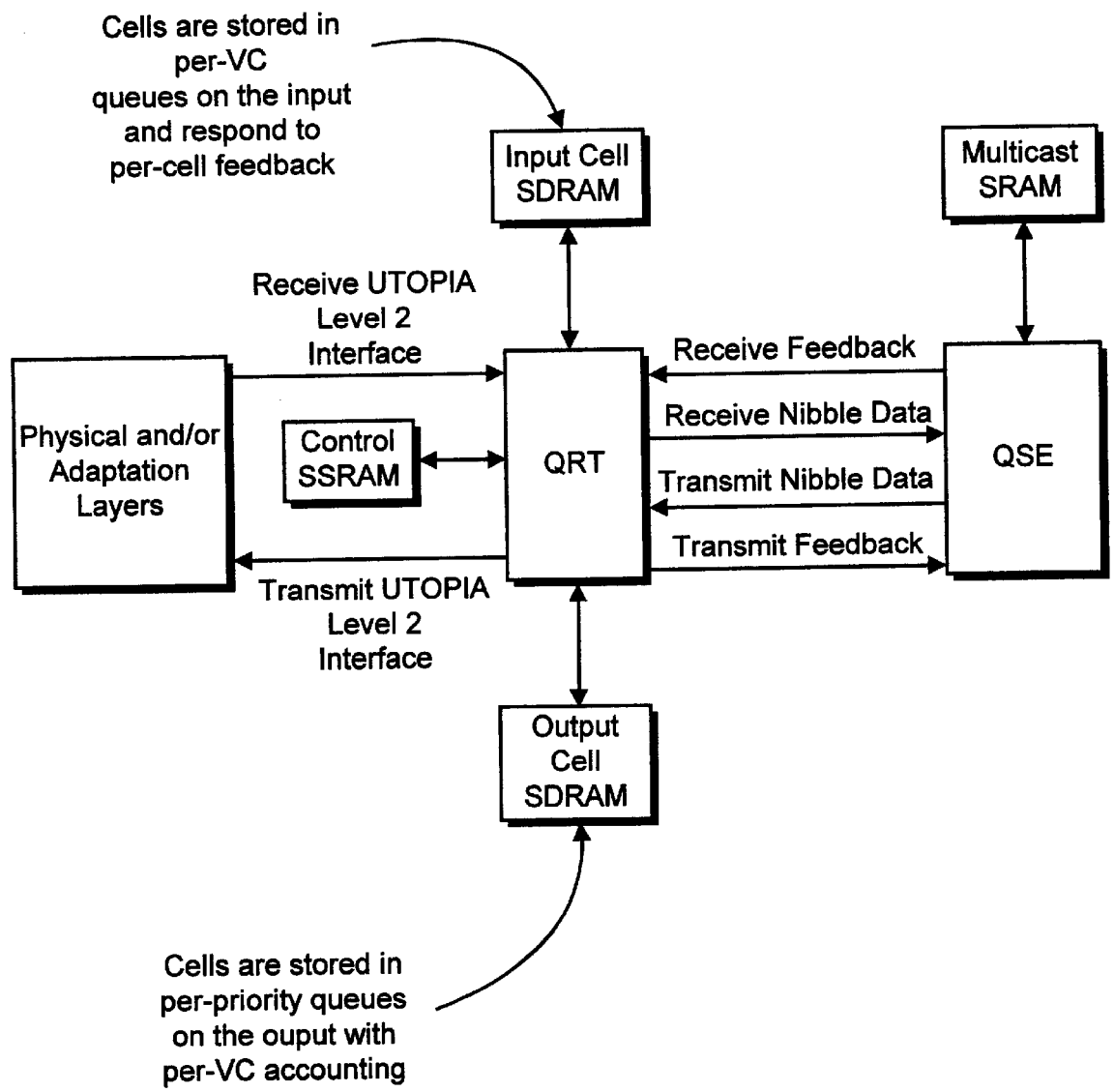
FIG. 6 shows a QRT System Overview.
Figure 7:
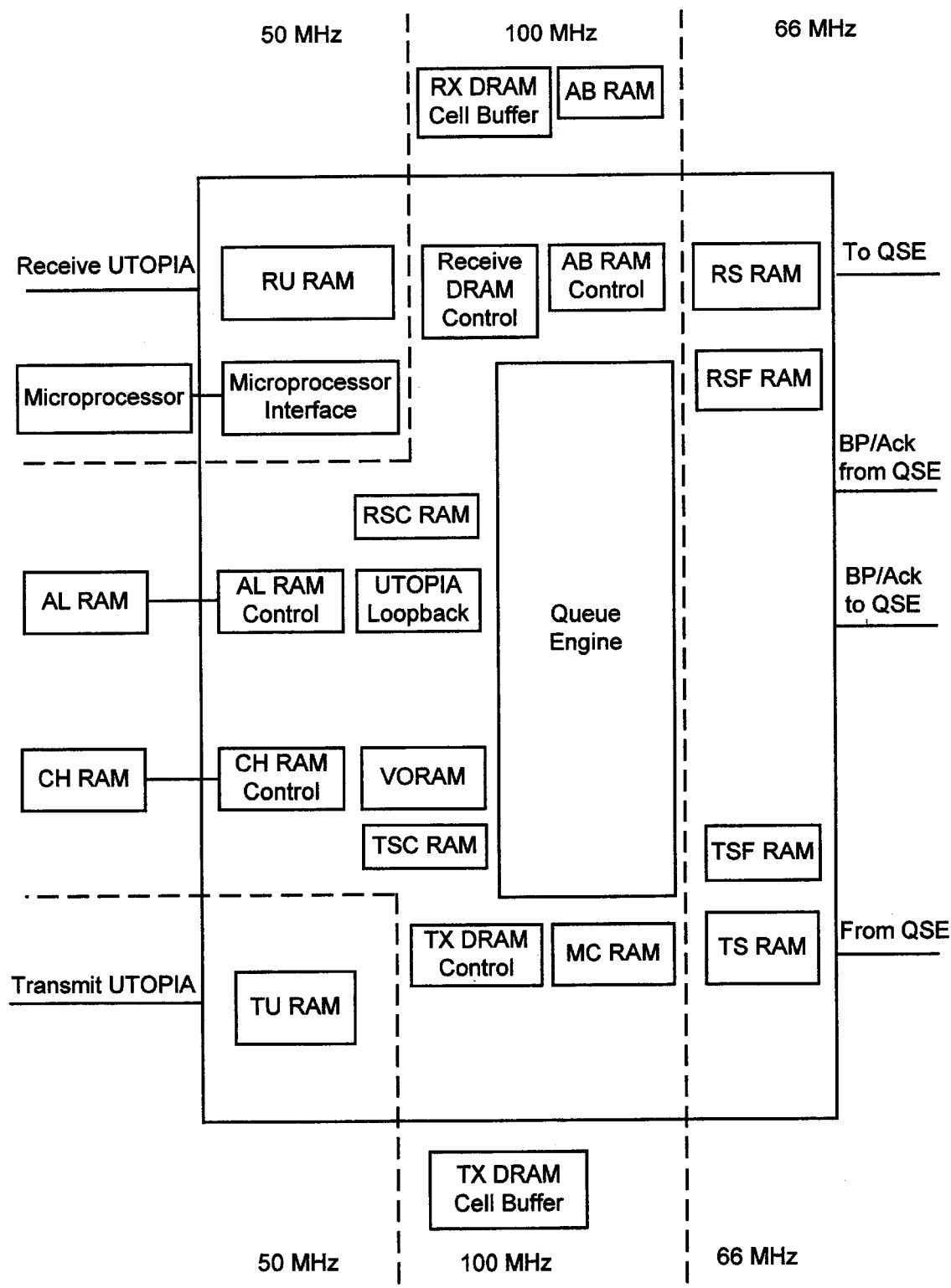
FIG. 7 shows a system diagram of internal QRT blocks and external interfaces.
Figure 8:
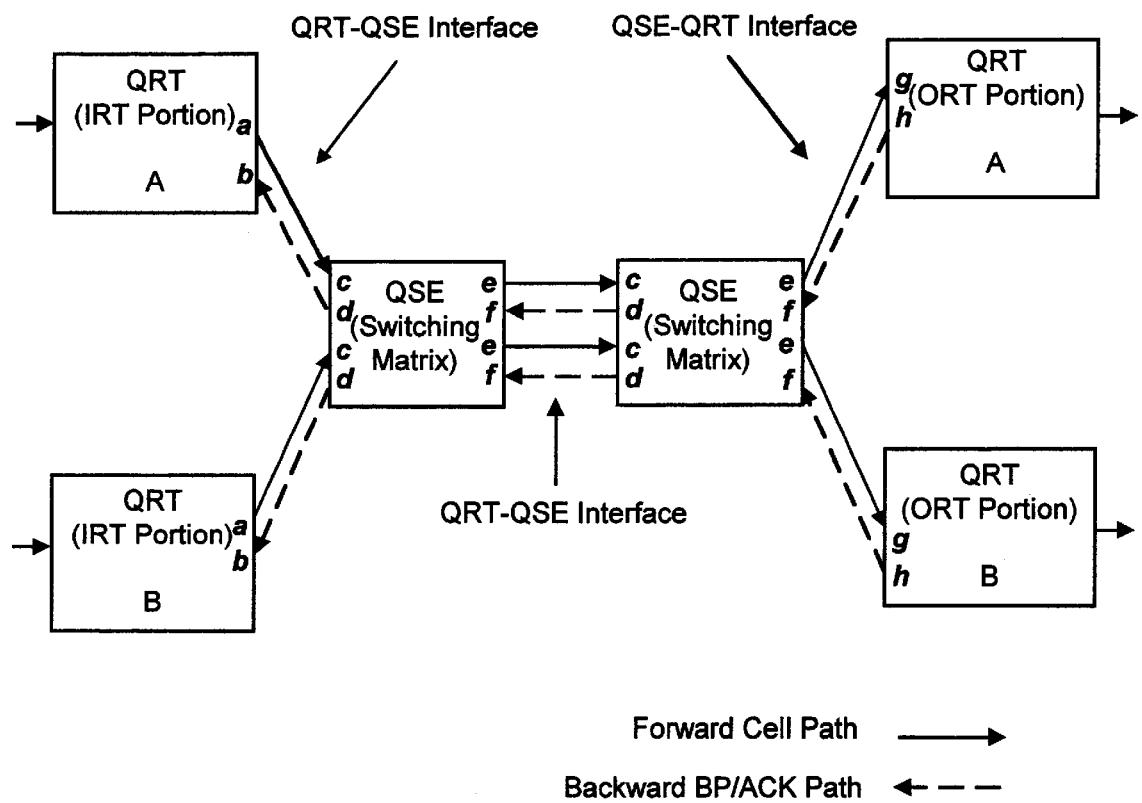
FIG. 8 shows basic data and signal paths between QRTs and a representative portion of QSEs.
Figure 9:
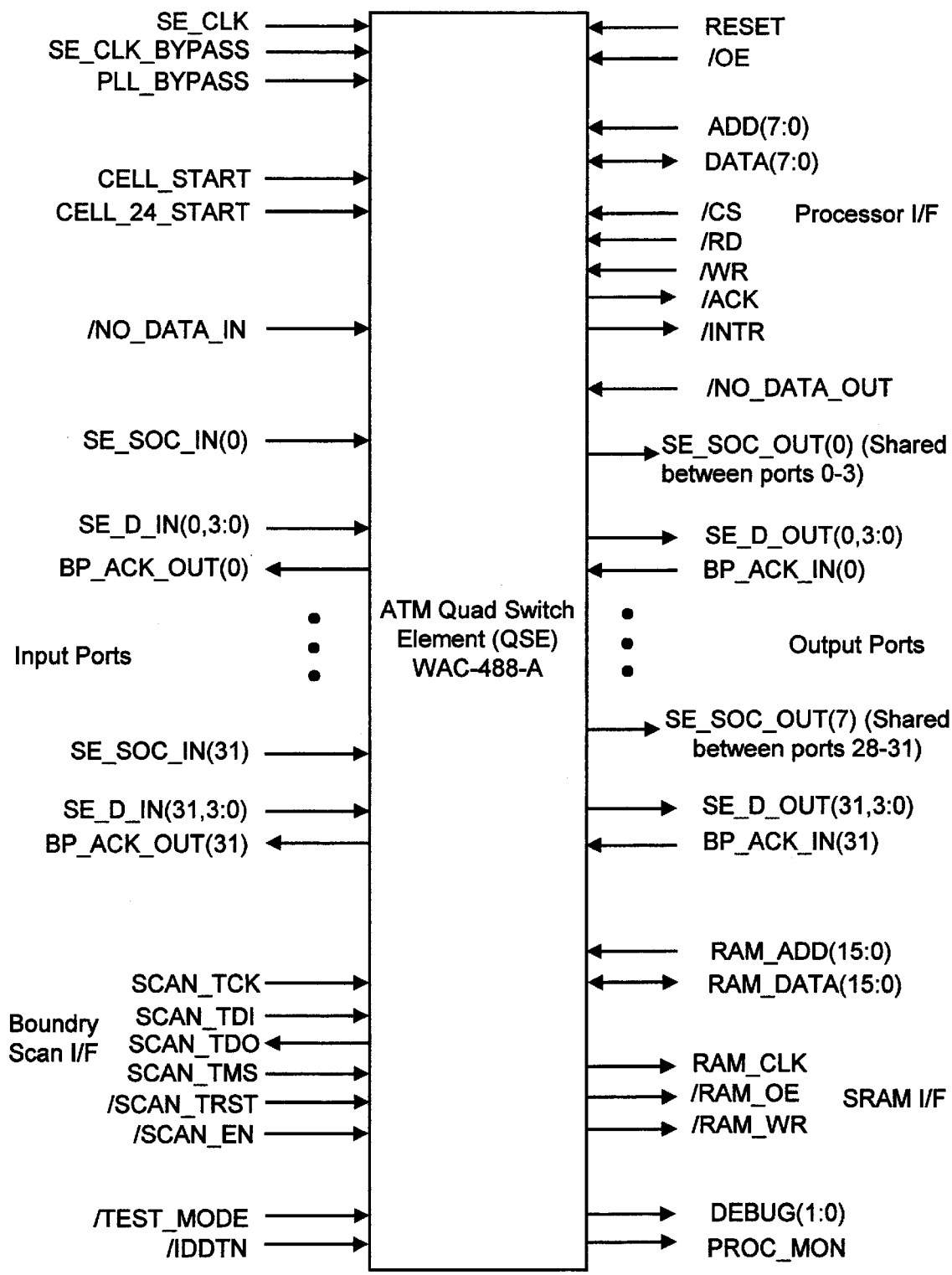
FIG. 9 shows a QSE 488 pinout block diagram.
Figure 10:
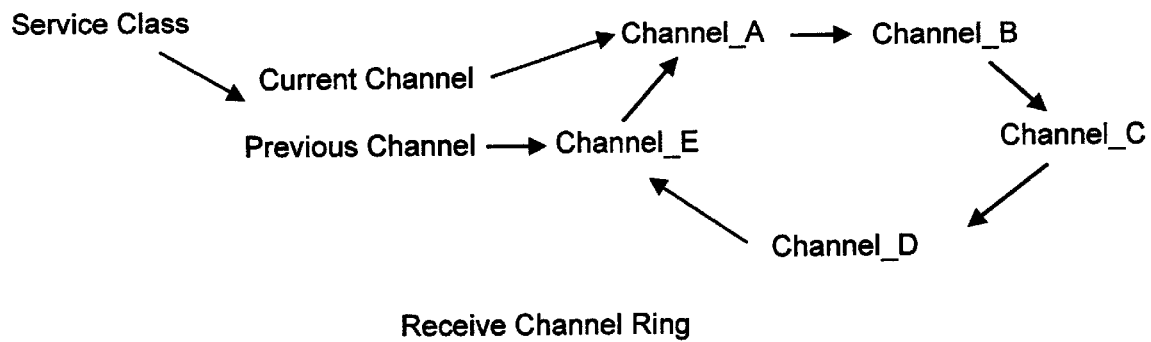
FIG. 10 illustrates the operation of the various receive channel ring.
Figure 10:
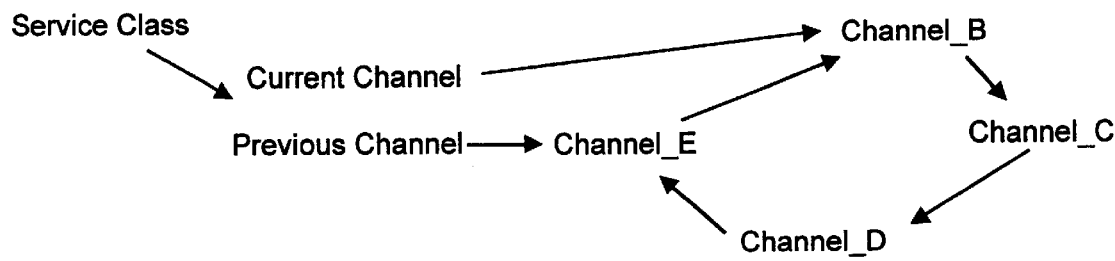
Figure 10:
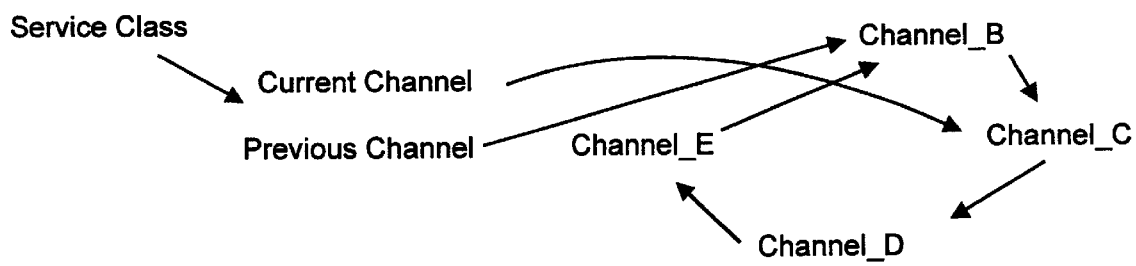

According to one embodiment, each cell counter may be constructed as a separate arithmetic/logic unit (ALU) for independently incrementing or decrementing its count value and independently comparing that value to loaded thresholds so as to speed processing of a cell. FIG. 4 shows one example of details of an ALU and is described in more detail below. It should be understood that depending on overall configuration, count values may remain in an ALU for extended period and not need to be loaded from memory. Count values for a device, for example, might remain always loaded in their respective ALU. Alternatively, count values could be loaded into a register and incremented and compared by a central processing unit.

4. Detailed Description of SE

Figure 3:
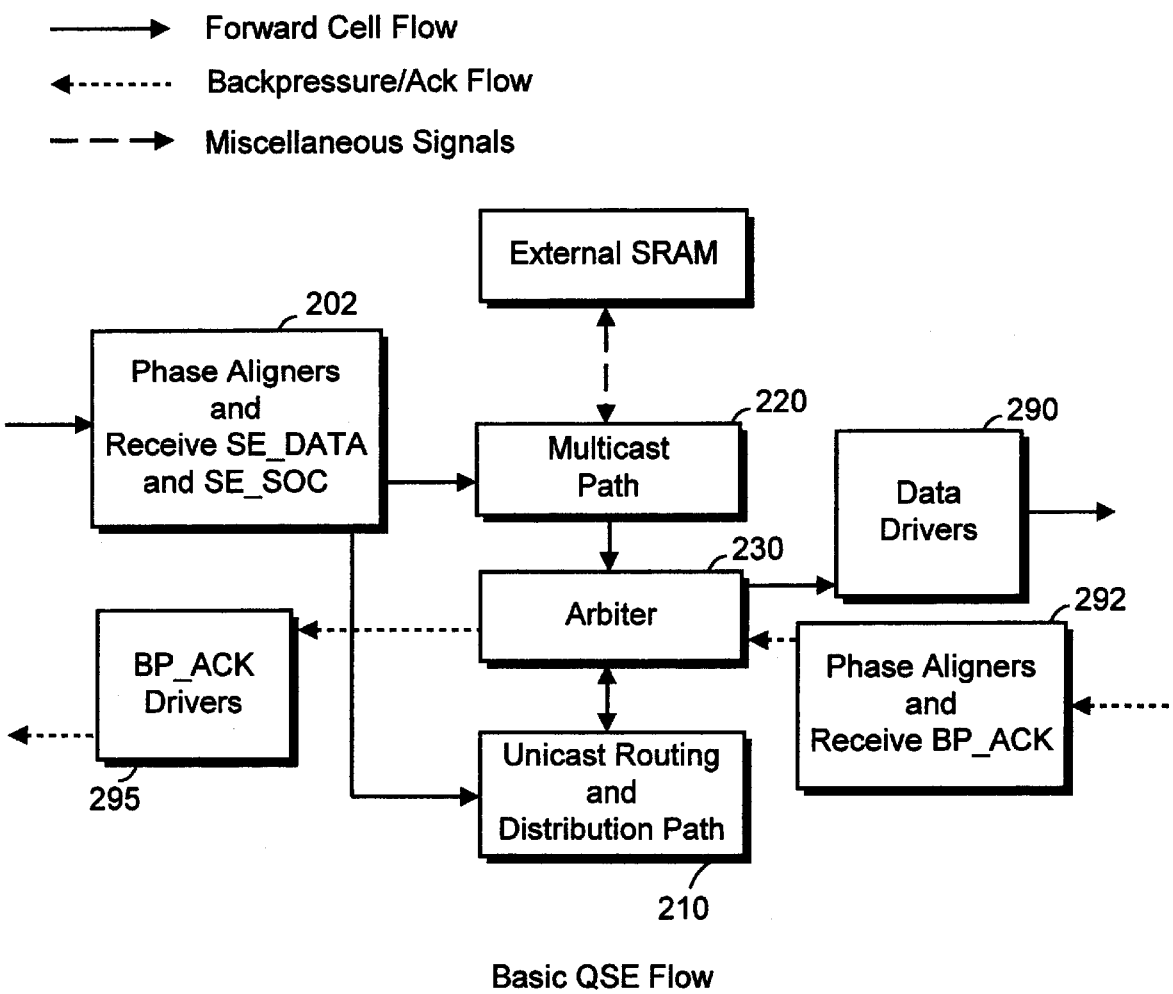
FIG. 3 is a block diagram showing the basic routing and arbitration of data in a switch element according to an embodiment of the invention.

FIG. 3 is a block diagram showing the basic routing and arbitration of data in a switch element according to an embodiment of the invention. One advance of the invention is that cells may be routed from one end of the switch fabric to the other end in a single cell time and are not queued anywhere in the switch fabric. This feature, when combined with other features described herein, allows for flexible and efficient handling of cell traffic. While this feature could be used to handle all cell traffic according to the invention, including multicast traffic (MC), in a specific particular embodiment buffer memory associated with individual SEs is used when handling multicast (MC) traffic. This is done in part due to certain limitations in circuitry and processing. MC traffic is stored in an SE buffer for at least one cell cycle before it is forwarded, similar in several respects to MC cell routing as described in the '861 patents. Thus, in one embodiment, the new architecture combines a memoryless operation mode for handling unicast traffic with a memoried mode for handling and multicast traffic. In one embodiment, an SE in accordance with the invention determines a best path for its multicast traffic and separately determines a best path for its unicast traffic. A multicast/unicast arbitrator then arbitrates between the two solutions to determine which cell flows out of a particular output port of the SE.

4.1. SE Elastic Input Buffer

In a further aspect of the invention, SE inputs contain an elastic buffer on each input to allow cells travelling from different distances to be delayed in their arrival time into the SE processing. This allows cells on all inputs will enter into the SE routing processing at the same time to allow for effective routing and arbitration.

4.2. Ganging of SE Outputs

According to the present invention, SE outputs may be aggregated or ganged when multiple outputs are travelling into the same SE in a next stage. In specific embodiments, gangs of 1, 2, 4, 8, 16 or 32 are possible in unicast modes and gangs of 1, 2, or 4 are possible in multicast mode. In a specific embodiment, unicast and multicast ganging need not be the same. Ganging outputs reduces the number of dropped cells in an SE when contention occurs for SE outputs by making those outputs wider. In one embodiment, as described below, routing in an SE takes place more quickly in proportion to how much the outputs are ganged.

4.3. OSE division 16/16 mode

In a further embodiment, a 32-input-QSE according to the invention, may be configured to operate as two 16-port-SEs. This configuration allows one-half of the QSE to carry traffic in a forward direction and the other half to carry traffic in a reverse direction. In this configuration, a single QSE chip may be coupled with four QRTs to make a 16×16 switch.

4.4. Operation of Switch Element

The basic operation of an SE in accordance with the present invention may be understood as comprising the steps of: receiving cells on input ports, determining a routing for cells to output ports, arbitrating which cells will actually be transmitted out of given output ports, transmitting those cells out of output ports, and sending backpressure/acknowledge signals in a reverse direction back to input ports. In one embodiment of the present invention, these steps are performed differently and for the most part independently for unicast and multicast cells, with arbitration between unicast and multicast cells taking place at the final arbitration step.

FIG. 3 illustrates the basic path for these steps. Cells are received by phase aligners and elastic buffer 202. Unicast cells are sent to a unicast routing path 210, multicast cells are sent for routing to multicast path 220, arbiter 230 determines which cells will be output by data drivers 290. In the reverse direction, a $BP_{13}$ ACK signal is transmitted back through arbiter 230 to the correct input port through drivers 295.

4.4.1 Memoryless Cell Receiving

In memoryless mode, an SE according to the present invention performs very fast routing determination for an incoming cell based on the first data portion of the cell. The first portion of the cell includes a routing tag that is appended to the cell by the IRT. In each SE in the fabric, the first several fields (or nibbles) of a routing header are read and removed from the beginning of the cell header, are used to determine a route through the SE, and then appended to the end of the routing header of the cell. Appending the nibbles to the end of the routing header facilitates handling of cells through the switch fabric by allowing cells to remain the same length, preserving parity, and speeding routing of the cells by a next stage switch element Some prior art ATM switches deleted the first parts of the routing tag after the tag was used by the SE. According to one embodiment, each stage of SEs in a fabric modify the routing header as it is passing through that stage. In this way, as a cell is being received by an SE, that SE is immediately able to begin routing the cell based on the first few nibbles of header.

In one embodiment, a Routing Tag added by an IRT specifies the routing path from the middle of the switch fabric to the end. The QSEs randomly distribute UC cells in the stages before the middle stage. The QRT knows the size of the switch fabric and each SE in the fabric knows whether it is randomizing or not.

4.4.2 Memoryless Routing and Arbitration

According to the present invention, in a given cell cycle, an SE receives a number of unicast cells on its input ports and must determine, in that cell cycle, which output ports those cells will be connected to and which cells will be dropped. In one embodiment, an SE has 32 input ports and can receive and forward up to 32 unicast cells.

For each cell entering the SE, an output gang for that cell is either specified in the cell header appended by the IRT or the SE assigns the gang randomly. Within each output gang, the SE then sorts the UC in top down order on a priority basis with the highest priority in highest numbered output port of the gang. The UC arbitration is then complete.

In a specific embodiment QSE sorting is done in parallel and for every gang there is a selector network, which is a hardware logic circuit for the gang. The selector network for a gang chooses the input ports that want to go to that gang based on priority. Routing is therefore done in parallel. In one embodiment, a QSE has only four separate selector networks, and if more than four gangs are defined, the networks are used in pipeline fashion until all gangs are processed. In the case where two cells for a selector network have exactly the same tag, the SE randomly chooses between them by placing random bits in a lower order portion of the tag.

In an SE according to the present invention, routing and arbitration take place during the first several clock cycles of a cell cycle. Therefore, the beginning of a cell is played out of an SE output port while the middle and end of the cell is still being played into the SE. The current invention includes very fast routing techniques to reduce the latency through a QSE and routing is designed to use the minimum number of clock cycles. The routing algorithm according to the present invention runs in less time if there are less bits in the routing tag so that a gang(8) runs more quickly than a gang(4). In one embodiment, cells emerge from an SE as follows: for gang(1)=13 clocks; Gang(2)=10 clocks; Gang(4)=8 clocks from when a cell exits the elastic store until cells are played out of the SE.

4.4.3 Multicast Cell Receiving and Storae into MC Buffers.

In the present invention, the receiving of MC cells and assignment of those cells to cell buffers and the control of cells in cell buffers are handled, in the most basic sense, similarly to as described in the '861 patents. MC cell buffers are dynamically allocated to incoming multicast cells by a multicast queue engine and wherein each MC cell remains in a buffer until it can be sent out of all outputs to which it should be routed. In one embodiment, however, a QSE can store up to 64 MC cells and can route cells in accordance with several different gang definitions and with three priorities over the 32 output ports. MC cell buffers within an SE may be segregated according to priority.

Each MC cell buffer has associated with in an MC group vector indicating to which output ports the cell has yet to be routed, largely as described in the '861 patent.

4.4.4 Multicast Routing and Arbitration

For multicast routing, during one cell cycle, the SE must choose which of up to 64 stored MC cells to connect to output ports. This task is complicated by two factors. First is that each of the 64 buffered MC cells may connect to multiple output ports and second is that MC cells must be output according to both the priority of the cells and according to which cell has been stored the longest. The invention accomplishes both these task in a method that quickly chooses the best MC cells and that also facilitates picking between MC and UC cells in the final arbitration stage.

4.4.4.1. Multicast Timestamp (TS)

According to the invention, each MC cell receives a timestamp when it is placed in the MC buffer. The TS mechanism allows the MC arbitration algorithm to simultaneously accomplishes the goals of keeping cells in FIFO order and allowing multipriority multicast.

The purpose of assigning a TS is to determine which stored cell is oldest. One straightforward way to do this would be to simply record an absolute time when each cell is stored in a buffer and compare that to a clock. However, because there is no definite limit to the amount of time a particular MC cell remains in the MC buffer it is uncertain how many bits would need to be stored to keep stored cells properly in order.

An SE according to the invention solves this problem recognizing that all that is required for correct routing of MC cells is that the SE can always identify different ages of cell buffers in relation to one another. In a specific embodiment, with 64 cell buffers, a TS of six bits ensures that MC cells can always be sent out in proper order even when there is a different arrival time for each stored buffer.

In a specific embodiment, whenever one or more MC cells are placed into the MC buffer, they will be assigned a TS of zero (000000). The SE examines all pre-existing TSs starting from the newest possible time (000000) until it finds a TS that is not used. At that point all TS values below that number are incremented by one, which always assures that any prior cells with TS of 0 have their TS promoted to 1 and therefore TS 0 is free to be assigned to all new incoming MC cells. In a specific embodiment, all the TS from the cell buffers are given to a sorter and the sorter looks for the first non-used number between 0 and 63 and returns that number, which is broadcast to an engine/ALU associated with each MC buffer. The MC buffer engine compares that broadcast TS with its own TS and increments its TS by one if its TS is lower than the broadcast TS.

4.4.4.2. Multicast TAG

The SE uses the TS and the priority to build a MC tag for each of the cells in the buffer. In one specific embodiment, the first two bits of the MC tag represent the priority, the next six bits are the TS, and the next one or two or three or four bits are the lowest one or two or three or four bits of the port number which is used to indicate which line of the gang the MC cell came in on. These final bits are necessary because each QSE independently keeps MC cells in FIFO order based on the port that the MC cell arrived on. Once the SE has constructed an appropriate MC tag for each buffer, the output gangs are determined that the MC cell with the highest tag for each output gang is selected. The highest numbered MC tag takes into account the priority, the TS and the gang. This further provides flexibility because changing the output scheme would only require a rearrangement of bits in the MC tag. The invention thus provides an efficient algorithm to solve a difficult cell scheduling problem and allows the SE to choose MC cells for all output ports in parallel at the same time. Prior art SE implementations used a slower, iterative approach where cells were picked on an output port by output port basis.

It will be seen from the above that an SE treats the priority as if it was the most significant bits of the time. The SE can then take the effectively "oldest" cell first and at once send out the highest priority cells and the oldest cells per priority.

As in some prior art SE implementations, the SE of the current invention does not keep track of VCs and only keeps track of cell priorities. In one embodiment, an SE establishes three priorities for both MC and UC cells, and these priorities are mapped by the IRT to the different SCs. The present invention provides improved MC routing to allow an SE to handle more than one MC priority and to perform multi-priority MC in a distributed memory system switch fabric with an algorithm that ran fast enough for a 32×32 port SE. Multicast routing is further complicated by the fact that a particular MC cell may be routed out of multiple gangs, as defined by the MG variable. The establishment of MC groups is done in a similar way to prior art implementations.

4.5. Arbitration between Unicast (UC) and multicast (MC)

As described above, the SE determines its best choice of connections for 32 input ports to 32 output ports based on the tag of each cell. These cells are then sorted in top down order within a gang on a tag (priority) basis with the highest priority in highest numbered output port of the gang. For every gang there is a selector network, which is given as its input the priority tag of the cells that want to go of that gang. The selector network over all inputs that want to go to that gang then chooses the cells that make it.

The MC arbiter then does the same, but with the highest priority cell tags placed in the lowest numbered output port of the gang.

The final arbiter then looks at every port individually within a gang and picks the highest priority between the MC cell and the UC cell. (In one embodiment, there are three priorities for UC and three for MC.) In one embodiment, the final arbiter need only look at the two highest priority bits because other priority has already been sorted out at earlier stages. An MC tag includes the priority cell of the cell, the TS of the buffer, and which input port within a gang that the cell entered the switch element on. By combining all these elements into a single tag and performing the arbitration as just described, MC cells will always be selected for transmission first based on priority, then on age, then in the correct order that they entered the SE.

At the end of the arbitration process, cells that won the arbitration for each port are sent of those output ports. Information about cells that did not win is sent back to the MC buffer controllers and the ACK engine respectively.

5. Backpressure and Acknowledge

In one embodiment of unicast routing, an acknowledge signal (ACK) or a negative acknowledge signal (NACK) is delivered back to the IRT on a per VC basis for each data cell that is transmitted into the switch fabric. In a further embodiment, this ACK signal is delivered before the beginning of the next cell cycle to the same port on which the cell being acknowledged was being transmitted so that the cell's VC can be identified and a cell can be retransmitted in the immediate next cell cycle if the acknowledge was due to a blockage within the middle of the fabric that is likely to not exist during the next cycle..

In one embodiment of multicast routing, there is no ACK/NACK signal sent back to the IRT because a cell may be stored within the switch fabric and delivered in a later cell cycle. A multicast embodiment, however, uses a backpressure (BP) feedback signal to upstream SEs and the IRT to let the IRT know that a particular path is experiencing congestion so that a sender will not send certain cells that will cause congestion.

In one embodiment, the same physical line is used for BP and for ACK and there is one physical line per port. The signals are interpreted as ACK signals when unicast traffic has been sent by the IRT and as BP signals when multicast traffic is being sent. Both BP and ACK messages can be sent in a cell time and are distinguished by the value of a field. Data on the line is sent is serial fashion and several bits make up the BP or ACK packets. In a particular QSE embodiment, there are 32 of these signal lines, referred to as BP_ACK_OUT(31:0).

6. Specific Implement Of A SWITCH ELEMENT, the WAC-488

Aspects of the present invention are incorporated in the WAC-488, a specific switch element part developed by the assignee of the present invention. Details of this implementation are included herein for the sake of completeness and to provide additional disclosure, but should not be taken as limiting the invention. The 488 implements a single element of a scalable switch fabric. The 488 has 32 input and 32 output ports, each containing a nibble-wide data interface, a start-of-cell signal, and a backpressure/acknowledge signal. Groups of 1, 2, 4, 8, 16, or 32 ports can be configured to act as a single aggregate port for unicast traffic. For multicast traffic, inputs and outputs can be grouped together in groups of 1, 2, or 4 ports. The input multicast grouping and output multicast grouping mode need not be the same. The 488 can also be configured as a single 32 input×32 output switch, or as two independent 16 input×16 output switches.

The flow of cells through the 488 can be broken into two separate data paths, one for unicast cells, and the other for multicast cells. Unicast cells are routed from one end of the switch fabric to the other end in a single cell time. In other words, no unicast cells are ever stored in the switch fabric, only in the routing tables at the ingress and egress of the fabric. Multicast cells are routed in a store-and-forward method. Each 488 can store up to 64 multicast cells.

The unicast cell flow contains a distribution stage that can be used to distribute the routing of cells to outputs. The multicast cell flow contains an interface to an external SRAM that contains the Multicast Port Vector (MPV) information for routing cells to multiple outputs.

Phase aligners aid in the construction of large systems, since clock information is recovered from the data sent to each 488 switch fabric port. As a result, there is no setup or hold time requirements on these signals, and the overall clock distribution scheme within the system can be simplified. However, overall system jitter and skew between signals on the same switch fabric data port still has to be managed. Phase aligners are used on the BP_ACK_IN (31:0), SE_SOC_IN(31:0), and SE_DATA_IN(31:0, 3:0) signal lines. A variety of types of phase aligners as are known in the art may be used with the invention.

Another aid to the construction of large systems is an elastic store at each 488 input data port. The data elastic store allows data arriving from different ports to be offset from each other by up to a limit of 8 clock cycles. The internally generated and software programmable local CELL_START signal marks the end of an 8 clock-period window within which the Start-Of-Cell (SOC) marker on each of the SE_SOC_IN(31:0) lines must arrive.

6.1. Memoryless Cell Flow

Each of the 32 nibble-wide inputs is connected to an output by a crossbar. This crossbar is transparently controlled by the cell's routing tag, which specifies an input-to-output connection. In the event of a conflict for an output port, higher priority cells are given preference over lower priority cells. In distribution mode, incoming unicast cells are routed to outputs using a congestion technology described in a related application Depending on the gang mode, the 488 will need a certain number of routing bits to determine the output gang of a unicast cell (for example, in a gang 4, there are 8 output gangs, thus 3 routing bits are required by the 488; in distribution mode, no routing bits are needed). These bits are taken from the head of the routing tags TAG_0 through TAG_7 and then replaced at the tail.

6.2. Memoried Cell Flow

There are 64 internal cell buffers for multicast traffic that are shared between three multicast priorities: high, medium, and low. The 32 cell buffers are pooled for each group of 16 input ports. These cell buffers are dynamically allocated to incoming multicast cells by a multicast queue engine. Each cell is buffered until it can be sent out on all output ports to which it should be routed. These output ports are designated by a Multicast Group Vector (MGV) that is associated with each multicast cell.

When a multicast cell is received, its MGV is fetched from RAM and copied to the MULTICAST_QUEUE_COMPLETION register. The MULTICAST_QUEUE_COMPLETION register keeps track of which ports the cell needs to be sent to before its cell buffer can be cleared. The 488 has 128 MGV entries in internal SRAM, and support for up to 32K entries if an external SRAM is provided.

A higher priority multicast or unicast cell will preempt a lower priority multicast cell destined to the same output port. The preempted multicast cell will have to wait until the following cell time for another opportunity to send a cell to the output port.

6.3. Arbiter

The arbiter arbitrates between unicast cells and multicast cells contending for the same output port. Higher priority cells are given preference over lower priority cells. If a multicast cell and unicast cell have the same priority, one cell is randomly chosen. The random choice can be biased in favor of unicast cells or of multicast cells by using the UC/MC FAIRNESS REGISTER. This is necessary in multiple-stage switch fabrics since unicast cells are routed in a cut-through fashion and multicast cells are routed in a store-and-forward fashion. For example, consider a congested 3-stage fabric where unicast cells and multicast cells of equal priorities collide at each stage in the fabric. A unicast cell must make it from ingress to egress in one cell time. Its chances of doing this would be $(½)^3=⅛$. However, each multicast cell would have a ½ chance of advancing to the next stage in the fabric. The fairness register is used to bias the selection of unicast cells at different points in the fabric so unicast cells are favored at later stages in the fabric.

6.4. Backpressure and Acknowledge

The BP_ACK_OUT(31:0) lines are used to send information from a 488 to upstream 488s or QRTs. This line is used to send two kinds of information, one for unicast and one for multicast.

For multicast cells, backpressure information is sent. This tells an upstream QRT or 488 if in the next cell time it can accept another multicast cell. It also indicates what multicast cell priorities it can accept.

For unicast cells, cell transmit acknowledge information is sent. This signals if the unicast cell transmitted in the current cell time has made it to its destination QRT. If the cell has been dropped in the switch fabric, information is sent back on whether the cell was dropped internally to the switch fabric or at the output of the switch fabric.

6.5. WAC 488 External Port Descriptions

Each port is a 6-bit interface consisting of a nibble-wide data interface (SE_D), a start of cell signal (SE_SOC), and a backpressure/data acknowledge signal (BP_ACK).

The SE_SOC signals carry a repeating four "0s" and four "1s" pattern to guarantee transitions required by the phase aligner. The SOC on the data lines associated with an SE_SOC line is indicated by a break in this pattern. The SOC is a single "1" followed by five "0s".

6.6. Data Cell Format

The regular cell format is shown in Table 1 and the idle cell format is shown in Table 2. The idle cell format is chosen as to make the interface robust to both stuck-at faults, as well as bridging faults on the data lines.

TABLE 1

| | | | Regular Cell Format | | |
|---|---|---|---|---|---|
| Nibble | Symbol | Definition | | | Comment |
| 0 | Pres(1:0), MC, SP | Pres = | 10b | Cell present. | The MC ignored in the WAC-188 switch fabric where the SWITCH_GROUP/QUEUE field determines if a cell is a multicast cell. |
| | | | 01b | Cell not present (See Table 2). | |
| | | | 00b | Cell assumed to be not present.(failure). | |
| | | | 11b | Cell assumed to be not present.(failure). | |
| | | MC = | 1b | Multicast Cell. | |

TABLE 1-continued

Regular Cell Format

| Nibble | Symbol | Definition | Comment |
|---|---|---|---|
| 1 | SP(1:0), Priority(1:0) | SP           Spare bit.<br>SP(1:0) Spare bits.<br>Priority = 11b   High priority cell.<br>           10b   Medium priority cell.<br>           01b   Low priority cell.<br>           00b   Undefined. Cell discarded by 488. | Priority for the switching fabric.<br>NOTE: The QRT should be configured never to generate priority 00b cells as they are discarded by the 488. |
| 2 | TAG_0 | Routing tag 0 or MULTICAST_GROUP_INDEX(15:12) | MULTICAST_GROUP_INDEX(15) is currently not used in the 488. |
| 3 | TAG_1 | Routing tag 1 or MULTICAST_GROUP_INDEX(11:8) | Interpretation of TAG_3:0 depends on if the cell is a multicast cell or not. |
| 4 | TAG_2 | Routing tag 2 or MULTICAST_GROUP_INDEX(7:4). | |
| 5 | TAG_3 | Routing tag 3 or MULTICAST_GROUP_INDEX(3:0). | |
| 6 | TAG_4 | Routing tag 4. | |
| 7 | TAG_5 | Routing tag 5. | |
| 8 | TAG_6 | Routing tag 6. | |
| 9 | TAG_7 | Routing tag 7. | |
| 10 | OutChan_3 | Interpreted as OutChan(15:12) by a WAC-487A. | Not used by 488 |
| 11 | SP(1:0), MB, P | SP(1:0)   Spare bits.<br>MB        Mark bit: Cells that are present and have this bit set are counted by the TX_MARKED_CELL and RX_MARKED_CELL counters.<br>P         Set to odd parity by software over nibbles 11 to 1. | |
| 12 | OutChan_2 | Interpreted as OutChan(11:8) by a WAC-487A. | Not used by 488 |
| 13 | OutChan_1 | Interpreted as OutChan(7:4) by a WAC-487A. | Not used by 488 |
| 14 | OutChan_0 | Interpreted as OutChan(3:0) by a WAC-487A. | Not used by 488 |
| 15 | VCI_3 | VCI(15:12). | Not used by 488 |
| 16 | VCI_2 | VCI(11:8). | Not used by 488 |
| 17 | VCI_1 | VCI(7:4) | Not used by 488 |
| 18 | VCI_0 | VCI(3:0) | Not used by 488 |
| 19 | PTI(2:0)/CLP | PTI and CLP Field from the cell. | Not used by 488 |
| 20 | SEQ_1 | Interpreted as SEQ(7:4) by a WAC-487A. | Not used by 488 |
| 21 | SEQ_0 | Interpreted as SEQ(3:0) by a WAC-487A. | Not used by 488 |
| 22–117 | Payload | 48 byte of ATM cell a payload. | Not used by 488 |

TABLE 2

Idle Cell Format

| Nibble | Symbol | Definition | Comment |
|---|---|---|---|
| 0 | Pres(3:0) | Pres =   0100b Cell not present. | |
| 1 | IDLE_0 | IDLE_0 = 000b All 0. | |
| 2 | IDLE_1 | IDLE_1 = 1000b Marching 1. | Marching "1" pattern protects against bridging faults |
| 3 | IDLE_2 | IDLE_2 = 0100b Marching 1. | |
| 4 | IDLE_3 | IDLE_3 = 0010b Marching 1. | |
| 5 | IDLE_4 | IDLE_4 = 0001b Marching 1. | |
| 6–117 | Payload | Payload = 0000b | |

6.7. BP/ACK Signals and Encoding

The BP_ACK signal is used to signal Back Pressure/Cell Acknowledgment to the previous stage. To ensure the transitions required by the phase aligner, this line carries a repeating four "0s" and four "1s" pattern. The actual information is transferred by a break in this pattern. The break is identified by a bit inversion (Inversion1) on the line, followed by a mode, and two data bits, followed by a second inversion (Inversion2) of the expected bit, if the previous pattern had continued. This is followed by the last two bits. After these information bits, the repeating pattern restarts with four "0s".

The data acknowledge signal (BP_ACK) is used to indicate if a cell at the current cell time was successfully transmitted or not. Data acknowledge is a single line per port that returns from a cell's destination in the reverse direction from that of the data flow. If the cell is being blocked by the switch, this information is either generated directly by the 488; or if the cell is not being blocked by the switch, this information is forwarded from the next switch stage. The data acknowledge signal provides the following information to the QRT:

- The cell was successfully received by the QRT at the cell destination (ACK).
- The cell was not accepted by the QRT at the cell destination (Does not happen by design).
- The cell was blocked by the switch at the output of the switch fabric (ACK PAYLOAD Register).
- The cell was blocked internal to the switch fabric (ACK PAYLOAD Register).
- The cell was detected as a parity error cell by a 488 (ACK PAYLOAD Register)

Thus, direct information is provided to the QRT on a per-cell basis and thus on a per-VC basis. The 488 behavior to support the above scenario is as follows:

If the cell was a parity errored cell, and 488 is configured to Check Parity in the CHIP MODE Register, then the Parity Ack in the ACK PAYLOAD Register is sent (Default is ONACK).

If the cell was blocked at an output of the 488, then the Ack Payload is sent; or if the cell is dropped due to congestion, the ACK PAYLOAD Register is sent (Default is MNACK).

If the cell was blocked at an output of the 488 because the entire gang is disabled, then to be cleared when all ports to a QRT known to be unavailable.

If the cell was successfully routed through the 488, the return path is set up to route the data-acknowledge signal back from the next switch stage.

In the case of multicast traffic, the BP_ACK signal also serves as a backpressure signal, indicating at each cell time which priority multicast cells the 488 can accept on the following cell time on a given port.

6.8. Microprocessor Interface; Multicast SRAM Interface and Clocks and Timing Signals The 488 has a non-multiplexed, asynchronous, general-purpose microprocessor interface (PIF) through which the internal registers can be accessed. The external SRAM is also indirectly accessed through this interface. The 488 supports 128 internal multicast groups, which is expandable up to 32K through an external SRAM.

The 488 is driven from a single clock source up to a maximum clock rate of 66 MHz. To indicate the SOC, there is one SE_SOC_IN signal per input port. There is one SE_SOC_OUT signal per group of four outputs. Cells must arrive at the input ports within an 8-clock cycle window. A CELL_START is used as a reference for an internal cell start signal to determine the 8-clock cycle window in which the SOC signal on the SE_SOC_IN lines are valid. The internal cell start signal delay from the external CELL_START signal is programmed in the CSTART_OFFSET Register.

6.9. Cell Timing/Latency

The data latency through each 488 depends on the distribution mode. The maximum latency is shown in Table 3. The data acknowledge through each 488 is a maximum of five clock cycles.

TABLE 3

Data Latencies

| Aggregate Mode | Latency |
| --- | --- |
| 1 | 13 clock cycles |
| 2, 4, 8, 16, 32 | 10 clock cycles |

6.10. Distribution Algorithm

The 488 has an algorithm that allows unicast cells to take advantage of multiple paths in multistage switch fabrics. This algorithm is run simultaneously by all 488s in a system. Since the position (row and column) of each 488 is known (programmed in the SWITCH FABRIC ROW and SWITCH FABRIC COLUMN Registers), and they all receive a synchronizing strobe (CELL 24 START), each 488 can determine exactly what each other 488 is doing. This enables the 488s to act globally to minimize cell congestion in the fabric.

Each 488 needs to be informed when the 8-clock cycle window occurs during which the SE_SOC_IN is valid for the input ports. Generally, since this window can move (depending on the environment in which a card containing the 488s can be used), this window is made software programmable from the reference CELL_START signal by setting the CSTART_OFFSET register. The offset between the external CELL_START and the local CELL_START signal used internally to the 488 is programmable through the microprocessor interface (CELL START OFFSET Register) to allow for easy system synchronization.

The switching element performs cut-through routing wherever possible and requires the SOC be synchronized across all input ports. For greater flexibility, the switching element allows cells starting within a window of 8-clock pulses to be considered to be valid. The end of this 8-clock cycle window is also indicated by the local CELL_START signal.

The 488 switch latency from the local CELL_START signal to the first nibble depends on the gang mode. The switch latency is 8 clocks from the local CELL_START signal for all gang modes, except for gang mode 1 in which case the latency is 11 clocks. A CELL_24_START signal is used as a strobe to synchronize the internal state machines of all 488s and QRTs in the system. This signal must be coincident with the CELL_START signal when it occurs, and should occur every 4Nth cell time. For historic reasons it is called CELL_24_START, since in previous generation devices it had to be driven high every 24 cell times.

6.11. General Description of Phase Aligners

The phase aligners recover a clock from the data in the 488-to-488, QRT-to-488, and 488-to-QRT interfaces. The forward cell path consists of 5 signals, SE_D(3:0) and SE_SOC, while the backward path consists of one signal, BP_ACK.

In the forward cell path, the phase aligners lock to the SE_SOC IN signal that has guaranteed signal transitions. The recovered clock is then used to sample the other signals, SE_D_IN(3:0).

In the backward path, the phase aligners lock to the BP_ACK_IN signal that has guaranteed signal transitions.

6.12. Multicast Backpressure Control

Multipriority backpressure is issued (high, medium and low) based on the following two factors: Total buffer usage and Buffer usage on an individual port. The total buffer pool consists of 64 cell buffers that are divided into two pools of 32 buffers. One pool of 32 buffers is dedicated to the lower 16 ports, and the other pool of 32 buffers is dedicated to the upper 16 ports. By default each pool of 32 buffers is divided into the following three buffer categories: Buffers 0 to 23 are general purpose and will accept cells of all priorities (that is, low, medium, or high); Buffers 24 to 27 will only accept medium and high priority cells; Buffers 28 to 31 will only accept high priority cells.

Conceptually, consider all these 32 buffers arranged one above the other with buffer 31 on top and buffer 0 at the bottom. As multicast cells are accepted into the 488, the cell "floats" up to the first unused buffer. Thus, as cells keep arriving, eventually the lower buffers get filled up. Between buffers 23 and 24 is a "filter" that blocks low priority cells so no low priority cells will use any buffers above 23. This filter is the "1 st Threshold" indicated in the BP CONTROL Register. Between buffers 27 and 28 is another filter that blocks medium and low priority cells so no medium or low priority cells will use buffers above buffer 27. This is the "2nd Threshold" indicated in the BP CONTROL Register. Turning off either threshold (1st or 2nd) in the BP CONTROL Register-disables the corresponding filter.

This filtering allows considerable flexibility in the programming of what buffers can accept which priority cells:

1st ON, 2nd ON: 0–23: low, medium, high; 24–27: medium, high; 27–31: high 1st OFF,2nd ON: 0–27: low, medium, high; 28–31: high 1st ON, 2nd OFF: 0–23: low, medium, high; 24–31: medium, high 1st OFF, 2nd OFF: 0–31: low, medium, high Input ports are allotted buffers before they send backpressure. If an input gets allotted a restricted buffer, its backpressure will reflect the priorities of cells the buffer can accept. If backpressure is ignored and a cell of the wrong priority does end up in a restricted buffer the 488-will not lock-up. The cell will not be lost or discarded. It will go out correctly. Only the logic that recommends the priorities of the cells to be accepted is concerned about the thresholds. The logic that does the queuing and the logic that dequeues the cell should not be concerned with which cell is where. Hence ignoring the recommendation (as indicated by the backpressure) should be safe.

Finally, backpressure can be asserted on an input port depending on the number of pending cells are in the buffer pool from that port. This number is either 3 or 4, depending on the setting in the BP CONTROL Register. This feature guards against a single port flooding the entire pool with cells.

6.13. Backwards Compatibility to the WAC-187 and WAC-188 Devices

The WAC-187/188 INPUT MODE and the WAC-187-188 OUTPUT MODE registers allow inputports, in groups of 4, to be configured to the previous switch family. In this mode, the 488 clock rate is limited that of the previous switch family, currently 50 MHz All cells from a WAC-187/188 device are converted to multicast cells at the ingress to the 488s, and propagated through the 488 fabric as multicast cells. All cells to a WAC-187/188 device are converted from multicast cells to the WAC-187/188 format exiting from the 488.

6.14. Multilevel Reset

When the RESET pin is asserted, the 488 is in total reset. No access is permitted to any register sand all 488-driven signals, except the RAM_CLK are static at either 0 or 1. When the "Chip Hardware Reset" bit in the CHIP MODE register is enabled, all registers can be read from and written to, but do not attempt to access the multicast port vectors in the multicast RAM. The rest of the device is in full reset. When the "Chip Hardware Reset" bit in the CHIP MODE register is disabled, but the "SW Reset" bit in the CONTROL REGISTER is enabled, the processor has fast access to the multicast RAM. This mode allows the multicast port vectors to be set up quickly at initialization. In normal device operation, the processor has a single multicast RAM access every 118 clocks.

7. Suecific implement of a Routing Table, the WAC-487

Aspects of the present invention are also incorporated in the WAC-487, a specific routing table part developed by the assignee of the present invention. Details of this implementation are included herein in part for the sake of completeness and should not be taken as limiting the invention defined by the attached claims. The 487 is an advanced communications device capable of supporting very large, high-performance ATM switching systems. Its support of per-Virtual Channel (VC) receive queues, 64 service classes, complex multipriority scheduling algorithms, and integrated congestion management algorithms allows systems built with the QRT™ to support sophisticated network service offerings.

The QRT provides 622 Mbps of input and output buffered access to switch fabrics composed of either IgT WAC-188s or IgT WAC-488s (32×32 ATM QSEs) to support architectures from 1.2 Gbps to 320 Gbps. In addition, the QRT supports a stand-alone, purely output-buffered 800 Mbps switch mode. Per-VC receive queues, three types of per-cell switch fabric feedback, and per-VC cell selection algorithms are used to prevent head-of-line blocking commonly associated with input buffers. It also provides eight separate congestion thresholds, each with hysteresis, that selectively control AAL5 Early Packet Discard (EPD)/Packet Tail Discard (PTD), CLP-based cell dropping, and/or EFCI marking. Eight separate maximum thresholds are also supported. Additional highlights of the QRT include full VPI/VCI header translation, separate input and output cell buffers (up to 64K each), Virtual Path Connection (VPC)NVirtual Channel Connection (VCC) connections, and up to 16K VCs. The QRT provides a bidirectional connection between a UTO-PIA Level 2 interface and 4-nibble wide, 66 MHz switch fabric interfaces.. A significant switch speed-up factor, up to 1.6 times the line rate, is used to support full throughiput for many switch fabric configurations.

The QRT is an advanced communications device supporting a wide range of high-performance WARM switching systems. The QRT and the QSE enable the efficient and timely design of scalable, fault-tolerant, and linear cost ATM switching systems. Additionally, the QRT's support of per-VC receie queues, 64 receive service classes, and integrated congestion management algorithms allows systems built with the QRT to Support sophisticated network service offerings.

7.1. ORT System Overview

The QRT can be used in a stand-alone application that supports ATM switching up to 675 Mbps. The four switch fabric interfaces are looped back to the QRT, allowing the UTOPIA interface to be fully used. In this application, the QRT operates as an output buffered switch with no input cell buffering.

The QRT supports a backward compatibility mode that enables switch fabric connections to the WAC-188 (8×8 ATM Switch Element). Full functionality of the QRT is supported in this application except for per-VC switch fabric feedback. A number of other switch application are possible using either the QSE or earlier SE components, including a 16×16 switch application (2.4 Gbps) using two QRTs, eight ATM Routing Tables (WAC-187s), and six ATM Switch Elements (WAC-188s), a basic 32×32 switch application (5 Gbps) using eight QRTs and one QSE, and applications using modules that can be used in a range of switches with only the interconnection changing between different sizes. By locating the first and last stages of a 3-stage switch fabric on port cards, ATM switches from 2.4 Gbps to 80 Gbps can be realized with only three unique cards (port cards are to be used in pairs). As with the previous application example, the per-port cost for 10 Gbps, 20 Gbps, 40 Gbps, or 80 Gbps systems remain roughly constant.

7.2. Switch Fabric Interface

The QRT switch fabric interface consists of four groups of signals in each ingress and egress direction. Each group consists of a Start_Of_Cell (SE_SOC_OUT) signal, a nibble-wide data bus, and a backpressure acknowledge (BP_PACK_IN) signal. The cell start signal is transmitted at the ingress coincident with the data indicating the beginning of a cell. SE_SOC_OUT on the ingress is common to all four groups. The BP_ACK_OUT signal flows from the egress through the switch fabric in the direction opposite the data, and indicates whether a cell has successfully passed through the switch fabric. Other signals associated with the switch fabric interface are the switch element clock (SEL_CLK) and RX_CELL_START. To support the highest possible throughput for various switch fabric configurations, a clock speed-up factor of 1.6 is used. That is, the switch fabric is run at a rate that is effectively 1.6 times faster than the line rate.

7.3. Phase Aligners

Phase aligners are used to allow for extended device separation. The technique used is a clock recovery mechanism that requires only the switch fabric to be frequency synchronous. A master clock is distributed to all devices associated with the switch fabric, and the phase of the clock at each interface is dynamically adjusted to account for skew introduced to the signals. The phase aligner circuitry for each mterface responds to the cell start and feedback signals, which contain a high number of transitions to insure accurate phase adjustment of the clock for data and signal sampling.

7.4. Other Interfaces

The QRT's UTOPIA interface implements the ATM Forum standardized 16-bit, Level 2 reconfiguration, which supports up to 31 virtual outputs via five address bits. Up to 31 PHY or AAL layer devices with 16-bit UTOPIA Level 2 functionality can be connected to this interface, providing full duplex throughputs of 622 Mbps.

The QRT supports two Synchronous DRAM (SDRAM) interfaces providing up to 64K of cell buffering in both the receive and transmit directions. Each interface consists of a 32-bit data bus, a 9-bit address bus, two chip select signals, and associated control signals. The frequency of these interfaces is 100 MHz. Both Synchronous Graphic RAM (SGRAM) and SDRAM devices are supported. Clocking for these two interfaces is provided through the device.

The QRT supports up to 16K channels through a Synchronous SRAM (SSRAM) interface. The interface consists of a 32-bit data bus, a 16-bit address bus, and associated control signals. The frequency of this interface is 100 MHz. Clocking for this interface is provided through the device.

The QRT has data structures in the AL_RAM, including VPI/VCI address translation. The interface consists of a 6-bit data bus, a 17-bit address bus, and associated control signals. The frequency of this interface is 100 MHz. Clocking for this interface is The QRT stores the head and tail pointers for the receive direction in the ABR RAM. Each interface consists of a 17-bit multiplexed address/data bus and associated control signals. The frequency of this interface is 100 MHz.

The QRT host processor interface allows connection of a microprocessor through a multiplexed 32-bit address/data bus. The suggested microprocessor for this interface is the Intel i960. The microprocessor has direct access to all the QRT control registers.

7.5. SE_SOC and BP_ACK Encodings

The SE_SOC and BP_ACK signals have guaranteed transitions and special encodings. BP_ACK Encodings" which follows. The SE_SOC_IN and SE_SOC_OUT signals have guaranteed transitions and SOC encodings. The SE_SOC signals carry a repeating four zero and four ones pattern to guarantee transitions required by the phase aligner. The "Start-Of-Cell" on the data lines associated with an SE_SOC line is indicated by a break in this pattern. For a valid SE_SOC, the break in pattern is followed by reset of the background pattern such that it is followed by four zeroes and four ones. The first nibble (Tag 0) of the header is coincident with SE_SOC (break in pattern).

The BP_ACK_IN and BP_ACK_OUT signals have guaranteed transitions, and BP and ACK encodings. The BP_ACK signal is used to signal backpressure/cell acknowledgment to the fabric (QSE) at the egress and receive backpressure/cell acknowledgment at the ingress from the fabric (QSE).

To ensure the transitions required by the phase aligner the BP_ACK signal carries a repeating four zeros, four ones pattern. The actual information is transferred through encoded 7-bit packets that start with a break in this background pattern. The break (an inversion) on the line is followed by a mode bit followed by two bits of coded message and a second inversion (inverse of the first inversion). This is followed by two bits of code extension in the case of an acknowledgment packet (these bits are required to be "00"). In the-case of a backpressure packet, the next bit is the backpressure bit on the low priority multicast cells, followed by one code extension bit. The background is reset to four zeros and four ones after transmission of each packet.

The QRT and QSE allow back-to-back acknowledgment and backpressure packets. In the case of back-to-back acknowledgment and backpressure packets, the receiving device may see an inverted bit (a "1") followed by the rest of the packet instead of a reset background pattern. One backpressure packet and either one or zero acknowledgment packet is expected to be received during a cell time. The receipt of multiple acknowledgment or backpressure packets is a failure condition. Table 4 describes the backpressure and acknowledgment encodings.

TABLE 4

Backpressure and Acknowledgement Encodings

| Mode | Data 2 | Data 1 | Data 0 | Code Ext 0 | Description |
| --- | --- | --- | --- | --- | --- |
| 0 | 1 = Backpressure on high priority multicast cell. | 1 = Backpressure on medium priority multicast cell. | 1 = Backpressure on low priority multicast cell. | 0 | Backpressure information. This signal is present each cell time, regardless of whether a cell was transmitted or not (on that link). This signal is withheld if any problem is detected on the input port. |
| 1 | 0 | 0 | 0 | 0 | Signals no response. Treated as acknowledgement. |
| 1 | 0 | 1 | 0 | 0 | Signals Mid Switch Negative ACKnowledgement (MNACK). |

TABLE 4-continued

Backpressure and Acknowledgement Encodings

| Mode | Data 2 | Data 1 | Data 0 | Code Ext 0 | Description |
|---|---|---|---|---|---|
| 1 | 1 | 0 | 0 | 0 | Signals Output Negative ACKnowledgement (ONACK). |
| 1 | 1 | 1 | 0 | 0 | Signals ACKnowledgement (ACK). |

Delay between the external RX_CELL_START and local CELL_START is programmable through the RX_CELL_START_ALIGN register. The local CELL_START impacts the start of cell dequeue to the fabric. It also determines the period within a cell time during which the BP_ACK_IN (3:0) at ingress is valid. As such, the programmable CELL_START delay allows the flexibility to synchronize the various QRTs and QSEs that make the system.

7.6. ORT Cell Flow Overview

The basic flow of cells through the QRT is as follows:
1. A cell enters the QRT on the receive side from the UTOPIA interface and the channel number is looked up.
2. The cell is then either dropped or transferred to the receive cell buffer DRAM and queued in the receive queue controller depending upon six congestion management checks (both maximum and congested thresholds for the device, service class, and connection).
3. When an available cell time occurs, four cells are selected by the receive side scheduler, which reads the cells from the receive cell buffer DRAM and transmits them from the QRT into the switch fabric.
4. Once a cell is received from the switch fabric on the transmit side, it is again either dropped or transferred to the transmit cell buffer DRAM and queued in the transmit queue controller, depending upon ten congestion management checks (both maximum and congested thresholds for the device, virtual output, service class, service class queue, and connection).
5. When the cell is selected for transmission by the transmit side scheduler, it is removed from the transmit cell buffer DRAM and processed by the transmit multicast/header mapper for corresponding header translation and distribution.
6. The cell then is sent to the UTOPIA interface and exits the QRT on the transmit side.:

7.7. UTOPIA Operation

Cells received from the UTOPIA interface are first processed by the receive header mapper and then queued for transmission within the receive queue controller. The cell waits in the receive cell buffer DRAM for instruction from the receive queue controller to proceed to the switch fabric interface.

The QRT interfaces directly to a UTOPIA interface device without needing an external FIFO. The receive side UTOPIA has a 4-cell internal FIFO, and the transmit side contains a 3-cell FIFO. The QRT UTOPIA interface is 16 bits wide and operates at frequencies up to 50 MHz. It provides the following modes: UTOPIA Level 1 single-PRY interface; UTOPIA Level 2 multi-PHY interface

7.7.1 UTOPIA Level 2 Polling

The UTOPIA interface offers three modes of polling, as per the UTOPIA Level 2 specification: standard single cell available polling, Multiplexed Status Polling (MSP) using four cell available signals, and direct status indication using four cell available signals. This versatility in polling modes allows the WAC-487-A to communicate with many different PHY devices.

7.7.2 Multiplexed Status Polling (MSP) Using Four Cell Available Signals

In MSP using four cell available signals, up to four cell available responses occur every two clocks. The advantage offered by the MSP mode is the improved response time for PHY service selection. With this method, it is possible to poll 31 devices in a single cell time. PHY devices, however, must comply with this optional part of the UTOPIA Level 2 specification. A standard PHY device can be configured to use this mode even though it does not support it directly. To effect this, up to eight PHY devices can be configured with the addresses 0, 4, 8, 12, 16, 20, 24, and 28. When configuring the device, setting the MSP mode bit accomplishes direct status indication, since it is a subset of the implemented MSP method.

7.7.3 Priority Encoding

Each Virtual Output (VO) is assigned to either high or low priority. Of the high priority VOs, the lowest numbered VO that has indicated it can accept a cell and for which a cell is present, is selected. If no high priority VOs have a match, the lowest numbered VO that has indicated it can accept a cell and for which a cell is present is selected. High bandwidth PHYs should be assigned to high priority by setting UT_PRIORITY=1 for that VO. Further control over the service algorithm can be implemented by assigning the highest bandwidth PHYs within a priority to the lowest numbered PHY addresses. NOTE that the UTOPIA Level 2 specification is not designed to support oversubscription due to its lack of multipriority cell presence indications. The QRT interface assumes this is the case and does not attempt to share bandwidth among PHYs of the same priority.

7.7.4 Independently Configurable Interfaces

The receive and transmit sides of the UTOPIA interface are independently configurable for either single-PHY OC-12 or multi-PHY operation. The RX_OC_12C_MODE, TX_OC_12C_MODE, and UTOPIA_2 bits configure the device for such operation. This allows versatility in the types of PHY environments that can be supported (for example, those that contain high-speed, single-PHY devices, or where the QRT is called to do single-chip multi-PHY to high-speed single-PHY muxing operations. This is particularly helpful when interfacing to the RCMP-800 Operations, Admninistration, and Maintenance (OAM) processor as the output of that device has a single-PHY-like Saturn interface.

7.8. RT Receiver Operation

7.8.1 Receive VC (Channel) Lookup

The receive channel lookup uses two tables: a VI_VPI_ and a VCI_TABLE to generate a channel number for an incoming cell. The channel number in turn is used to access the Channel Control Block (CCB), in the connection table. The CCB contains the configuration and state for the connection. The Virtual Input (VI) number and the VPI bits are used to index into a VI_VPI_TABLE of up to 4K entries.

Each entry contains the base address of a block in the VCI_TABLE for that VP and the size of that block. A VCI_TABLE entry contains a channel number for that VCC. If it is a VPC, the VI_VPI_TABLE contains the channel number directly. Since the VC_BASE is just a pointer to the VC table, and the VC table holds no state information, the number of active VC bits can be modified during operation by creating a new VC table and then changing the VC_BASE and VC_BITS values to point to the new table in one write. This allows the eventual size of the VCI block to be guessed when the first connection arrives without penalty if that guess proves later to be too low. This method of determining the CCB allows a flexible and wide range of active VPI and VCI bits without requiring an expensive Content-Addressable Memory (CAM) or causing fragmentation of the CCBs.

7.8.2 Receive VC (Channel) Queuing

Receive cells are enqueued on a per-VC (channel) basis. This means that there up to 16K queues. Singly linked lists are used to queue the cells. The head pointers, the tail pointers, and the linked lists are all in external RAM.

7.8.3 Receive Channel Ring

The list of channels that are eligible to send a cell to the fabric are kept in per-service class rings. The ring is kept in external memory and pointers to the previous and current channels for each service class are kept in internal memory. A channel number is entered into the ring when the first cell for that channel arrives. While cells for that channel are present in the queuing system, the channel can be removed from the ring by the dequeue process and sometimes re-added to the ring by the process that updates the data structures with the results of from the last cell time.

7.8.4 Receive Congestion Management

The receive queue controller maintains current, congested, and maximum queue depth counts of cells on a per-VC, per-service class, and per-device basis. Three congestion management algorithms are available for use on a per channel basis. In each channel's RX_CH_CONFIG word are bits that enable EPD, CLP-based discard, and EFCI. These may be used in combination. In addition, PTD is supported as a mode of the EPD operation. A congestion hysteresis bit is kept for each threshold. This bit is set whenever the queue depth exceeds the congestion limit for that threshold. This bit remains asserted until the queue depth falls below half of the congestion threshold. The congestion limits are kept in an exponential form. The interpretation of the limits is the same for all measurements except the device limit. For the other measurements, the value of 0 causes the measurement to always find congestion. The value of 1 may not be used. The value of Fh causes congestion to be found for the limit when the queue depth is 31744. This allows a 15-bit value to be used to store the state of each measurement except the device measurement, which has a 16-bit value.

7.8.5 Receive Queue Service Algorithm

Each switch fabric cell time, the receive queue controller selects up to four cells for transmission to the switch fabric. The controller supports per-channel (per-VC) queues with 64 service classes. The controller addresses the following issues: Quality of Service (QoS), Cell Delay Variation (CDV) minimization, Minimum Cell Rate (MCR) guarantees, and fairness maximization. The flexibility of the controller ensures that VCs receive their expected bandwidth in a timely fashion depending on their traffic requirements.

The controller has a scheduler which selects cells to be placed in pipelined, "Ping-Pong" buffers. Each of the four outputs to the switch fabric has two buffers: while a cell in buffer A is being transmitted, another cell is selected and placed into buffer B. On the subsequent switch fabric cell time, the buffers are "Ping-Pongee", and the cell in buffer B is sent. Meanwhile, another cell is selected for buffer A. An exception to this process is when the controller receives a negative acknowledgment (NACK) for transmission of a cell. There are two cases: the NACK is an MNACK, indicating cell transmission failed due to collision in the middle of the network, or else the NACK is an ONACK, indicating cell transmission failed due to collision at an output of the network.

In the former case, the cell's switch fabric priority (assigned during VC setup) is compared with that of the cell (if any) in the other Ping-Pong buffer. Call the first cell X, and the second cell Y. If the priority of cell X is greater than or equal to that of cell Y. the buffers are not ping-ponged, and cell X will be resent next time. If the priority of cell X is less than that of cell Y, cell X remains in its buffer, and the buffers are ping-ponged as usual, with cell Y being sent next. In the latter case, the cell is requeued at the head its VC's queue. Thus, the cell will be retransmitted, but at a later time than if the cell was MNACKed. The switch fabric has been specially designed to minimize the possibility of consecutive collisions at the same place in the middle of the network, and thus a cell's transmission that failed in that manner stands a good probability of being successful in an immediately subsequent transmission attempt. Collisions at an output of the network are more likely to be recuring for a period of time, and thus the next transmission attempt is delayed.

The scheduler that places cells in the Ping-Pong buffers operates as follows: The service classes are arranged in a tabular fashion. A service class is designated for either unicast or multicast traffic.

Additionally, a service class is designated as either strict priority SC1, strict priority SC2, or general purpose (GP). Associated with each service class is a weight of either 1, 4, 16, or 64. This information is used by the controller to decide which service class to service. Following this decision, the selected service class' VCs are serviced in a round-robin manner. The selected VC then transmits the first cell in its queue.

The general algorithm for deciding which service class to service is as follows (certain multicast service classes may be ineligible for selection in particular modes or operating conditions; these will be described later):

1. Strict priority SC1 has primary service priority. If there is an SC1 service class with a cell, it will be selected. The SC1 service classes are serviced in a weighted round-robin manner, alternating between unicast and multicast classes ($Q_0$, $Q_{32}$, $Q_1$, $Q_{33}$, $Q_2$, $Q_{34}$, $Q_3$, $Q_{35}$, $Q_0$, . . . ). The SC1 round-robin pointer will remain pointed at a service class for up to w cell selections, where w is the service class' weight. If no cells are available in a service class, the round-robin pointer is advanced. Thus, the most time-critical VCs should be placed in an SC1 service class. The pointer for the SC1 service classes is separate from the pointer to the SC2 and GP service classes.

2. Strict priority SC2 has secondary service priority. It is treated in the. same fashion as SC1, except it has its own independent round-robin pointer and the weighted round-robin order is: $Q_4$, $Q_{36}$, $Q_5$, $Q_{37}$, $Q_6$, $Q_{38}$, $Q_7$, $Q_{39}$, $Q_4$, . . .

3. If no cell exists in the strict priority classes, then the controller accesses the timeslot-based priority table in a round-robin manner. Each entry of this table contains a general purpose service class number. If the service class pointed to by the active entry has cells, that service class is selected. The active entry is incremented to the next time slot each time the timeslot table is accessed. The table has 127 entries and wraps around. This servicing mechanism provides the MCR guarantee on a per-service class basis. The number of times a service class is placed in the timeslot table can be used to determine its MCR.

4. If no cell exists in the strict priority classes, and no cell exists in the service class pointed to by the active entry of the timeslot-based priority table, then the GP service classes are serviced in a weighted round-robin manner similar to the SC1 and SC2 classes ($Q_8$, $Q_{40}$, $Q_9$, $Q_{41}$, $Q_{10}$, $Q_{42}$, $Q_{11}$, $Q_{44}$, . . . , $Q_{31}$, $Q_{63}$, $Q_8$, . . . ). Again this has a separate round-robin pointer than that kept for the SC1 and SC2 service classes.

Certain multicast service classes may be ineligible for selection due to the aggregate mode, and the backpressure from the switch fabric. The QRT can be set to multicast aggregate mode of either 1 or 4. In the former case, each of the switch fabric outputs of the QRT are treated as distinct outputs. Multicast connections must be specifically assigned to a service class in the corresponding column of multicast service classes (there are 32 multicast service classes, with four columns of eight classes each), since all the cells of a multicast VC must utilize the same output. In this mode, only one column (eight) of the multicast service classes will be eligible for selection, the other three (24 service classes) will be ineligible; Service classes 32, 36, 40, 44, 48, 52, 56, and 60 correspond to port 0. Service classes 33, 37, 41, 45, 49, 53, 57, and 61 correspond to port 1. In the latter case, the four outputs are treated as one logical output, and thus all multicast connections may be selected for any of the four outputs. Additional service classes may be ineligible due to backpressure (BP) from the switch fabric. There are three types of backpressure: high, medium and low. High BP renders the eight SC1 and SC2 multicast service classes ineligible. Medium BP renders the first eight GP service classes ineligible (two rows of four). Low BP renders the last 16 GP classes ineligible (four rows of four).

The receive queue controller scheduler provides the following benefits:

QoS—the strict priority scheme between SC1, SC2 and GP service classes, and the weighted round-robin algorithms allow satisfaction of QoS guarantees.

CDV minimization—the treatment of the strict priority service classes ensure that cells within these service classes get timely service.

MCR guarantee—the timeslot table ensures that all service classes will receive a minimum amount of servicing (clearly, the aggregate bandwidth given to the SC1 and SC2 VCs affects the remaining bandwidth to be divided between the GP service classes).

Fairness maximization—how service classes (1, 4, 16, or 64) are weighted allows different service classes to support different bandwidth requirements (e.g., high bandwidth service classes are assigned 64 and are serviced 64 times as often as low bandwidth service classes, which are assigned 1).

7.8.6 Receive Sequencing Algorithm

One of the service guarantees that ATM offers is the FIFO delivery of cells. Since the QRT can send multiple cells from a channel simultaneously across the fabric, and not all of those cells will get through on the first try, the QRT must support an algorithm to make sure that the cells can be put back into order. The algorithm that it supports is a classic window algorithm where only N cells are allowed to be outstanding without Acknowledgment. In the WAC-487-A, N is either 1 or 2. This limits the data rate of an individual connection to around 155 Mb/s. The cells are sequence numbered and reordered at the far end.

This algorithm is implemented by removing the channel from the ring of eligible channels whenever 2 cells are outstanding. This is termed as Run-Limited. It also removes it if the last cell present has been sent to the fabric. This is termed Cell-Limited. It will remain off the ring until the fabric transmission results for a run completing cell are known. For N=1, every cell completes a run. For N=2, the cell with the modulo lower sequence number is the run completing cell. At that time it will be added back onto the ring if there are more cells to send or if that cell was ONACKed in which case that cell can be resent. The pointers for these cells are stored in two locations in the CCB block. When starting from no cells in the fabric, the first cell sent is always in POINTER0 and the second cell is always in POINTER. For multicast cells, use N=2. For unicast cells use N=2. The N=1 setting is available for use, but has lower utility than the N=2 setting for virtually all situations.

7.9. Transmitter Operation 7.9.1 Transmit Queuing and Congestion Management

Transmit cells are enqueued on a per service class, per virtual output basis. As there are 31 virtual outputs, and 16 service classes per virtual outputs, there are a total of 496 queues. Singly linked lists are used to queue the cells. The head and tail pointers are in internal RAM and the linked lists are in external RAM.

A cell received from the switch fabric interface is queued by the transmit queue controller if it passes ten buffer threshold checks: both maximum and congested thresholds for the device, virtual output, service class, queue, and channel. The cell waits in the transmit cell buffer DRAM until the transmit queue controller selects it for transmit multicast/header mapping. The cell then exits the device through the UTOPIA interface. A congestion hysteresis bit and limits are stored as above. Three congestion management algorithms are available for use on a per channel basis. In each channel's TX_CH_CONFIG word are bits which enable Early Packet Discard (EPD), Cell Loss Priority (CLP) based discard, and Explicit Forward Congestion Indication (EFCI). These may be used in combination. In addition, Packet Tail Discard (PmD) is supported as a mode of the EPD operation. There is an interaction between EPD and the resequencing algorithm, as elsewhere described.

7.9.2 Transmit Queue Service Algorithm

The transmit queue controller supports 16 service classes for each of its 31 virtual. As with the receive queue controller, the transmit queue controller addresses the following key issues: QoS, CDV minimization, MCR guarantee, fairness maximization, and output isolation.

The virtual output for which a cell is to be sent is determined first. This is done by doing a bit-wise AND of vectors of the presence of a cell for a VO, and the willingness of a VO to accept a cell. Of the matching VOs, the lowest numbered VO of high priority is selected if possible, otherwise the lowest numbered VO is selected.

Once the VO is known, the controller has a scheduler which selects a cell to be transmitted to the UTOPIA interface. The scheduler operates as follows: The service classes are arranged in a tabular fashion. A service class is designated for either unicast or multicast traffic. Additionally, a service class is designated as either strict priority SC1, strict priority SC2, or general-purpose (GP). Associated with each service class is a weight of either 1, 4, 16, or 64. This information is used to used by the controller to decide which service class to service. Following this decision, the selected service class' cells are serviced in a FIFO manner.

The general algorithm for deciding which service class to service is similar to that used by the receive queue controller, and is as follows:

1. Strict priority SC1 has primary service priority. If there is an SC1 service class with a cell, it will be selected. The SC1 service classes are serviced in a weighted round-robin manner, alternating between unicast and multicast classes ($Q_0$, $Q_8$, $Q_0$, . . . ). The SC1 round-robin pointer will remain pointed at a service class for up to w cell selections, where w is the service class' weight. If no cells are available in a service class, the round-robin pointer is advanced. Thus, the most time-critical VCs should be placed in an SC1 service class.

2. Strict priority SC2 has secondary service priority. It is treated in the same fashion as SC1, except it has its own independent round-robin pointer, and alternates: $Q_1$, $Q_9$, $Q_1$, . . . .

3. If no cell exists in the strict priority classes, then the controller accesses the timeslot-based priority table in a round-robin manner. Each entry of this table contains a general purpose service class number. If the service class pointed to by the active entry has cells, that service class is selected. The active entry is incremented to the next time slot each time the timeslot table is accessed. The table has 127 entries and wraps around. This servicing mechanism provides the MCR guarantee on a per-service class basis. The number of times a service class is placed in the timeslot table can be used to determine its MCR.

4. If no cell exists in the strict priority classes, and no cell exists in the service class pointed to by the active entry of the timeslot-based priority table, then the GP service classes are serviced in a weighted round-robin manner similar to the SC1 and SC2 classes ($Q_2$, $Q_{10}$, $Q_3$, $Q_{41}$, $Q_{11}$, . . . , $Q_7$, $Q_{15}$, $Q_2$, . . . ).

The transmit queue controller scheduler provides the following benefits:

QoS—the strict priority scheme between SC1, SC2, and GP service classes, and the weighted round-robin algorithms allow satisfaction of QoS guarantees.

CDV minimization—the treatment of the strict priority service classes ensure that cells within these service classes get timely service.

MCR guarantee—the timeslot table ensures that all service classes will receive a minimum amount of servicing (clearly, the aggregate bandwidth given to the SC1 and SC2 VCs affects the remaining bandwidth to be divided between the GP service classes).

Fairness maximization—the weighting of the service classes (1, 4, 16, or 64) allow different service classes to support different bandwidth requirements (for example, high bandwidth service classes are assigned 64 and are serviced 64 times as often as low bandwidth service classes, which are assigned 1).

Output isolation—the cells of channels destined for different virtual outputs are kept in separate data structures. This helps isolate the effects of congestion on one virtual output from causing congestion on another virtual output.

7.9.3 Transmit Resequencing Algorithm

The transmit end reorders the cells according to their sequence numbers. The resequencing of one algorithm ignores the incoming sequence number and accepts all cells as if their sequence numbers were correct. This can be used for multicast cells as the WAC-488 delivers them in FIFO order.

The resequencing of two algorithm inspects an incoming cell to see if it has the expected sequence number, e. If it does, the cell is immediately processed. If it has sequence number e+1, then it is stored to await the run completing cell (that is, the original expected sequence number, e). If it has neither sequence renumber e, nor sequence number e+1, a recovery algorithm is started which gets the channel back in sequence.

The resequencing of two algorithm interacts with EPD. When a cell is missing, the algorithm cannot know if the missing cell is an EOF cell or not. It is then necessary to defer the choice of whether to send both cells until the run completing cell is received. The choice of whether to send or drop one or more of the cells is affected by the EOF information because one frame that is being dropped may end, and another frame which is not to be dropped may start.

7.9.4 Transmit Recovery Algorithm

No recovery algorithm is needed for resequencing of one since the sequence number is ignored. For resequencing of two, when a cell with sequence number s is received, and s is neither equal to the expected cell number e, nor equal to e+1, the cell is dropped. The new expected sequence number (for the next cell) is set at s+1. The next time two cells are received in ascending sequence number order, the channel will have recovered its sequence. Using this algorithm, some legitimate cells may be dropped while recovering. E.g. if the next two cells are legitimate, but are received in descending sequence number order, they will both be dropped.

7.9.5 Transmit Multicast Cell Background Process

The transmit multicast background process traverses the linked list for that channel and prepares a list of pointers to cells and pointers to headers for multicast cells. This allows the dequeue process to replicate the cell with new headers to each entry in the linked list. This is necessary because multicast cells are bound to different destinations and need different headers. When a multicast cell arrives it is immediately stored to RAM. The pointer to that cell buffer as well as the OUTCHAN for that cell are put onto one of eight input FIFOs. There is one FIFO per input multicast service class. A background pointer replication process which runs at the UTOPIA rate copies pointers from the input FIFOs to the output FIFOs. It does so by traversing the linked list for that OUTCHAN and copying the pointer to the cell buffer to output FIFO for that service class on the proper virtual output. The background process dynamically identifies if any of the output FIFOs are full. If any become full, the process records which VO full for that service class and ceases transferring cells for that service class. Transfers still are free to occur for other service classes. Once the dequeue process serves a cell instance from that service class on the bottlenecked VO, the background process is free to continue to do replications for that service class. The background process runs at exactly the same rate as the UTOPIA interface. This allows it to transmit multicast cells at full rate out of the interface, even if each multicast cell is only going to one destination on this QRT.

7.9.6 Transmit Multicast Congestion Management

The transmit multicast can have congestion management applied to it. Three of the five congestion measurements apply. Those are the device, the service class, and the channel. The virtual output and the service class queue limits do not apply to multicast cells as they do not make sense. This is because only one copy of the cell is ever kept in the DRAM, independent of how many destinations it is headed for. Those counts contain only the number of unicast cells present.

The QRT can be configured to either generate or not generate back pressure on an per service class basis. If no back pressure is desired, configure TX_EX_MAX_SC_QD to half of the input pointer FIFO depth for that AL_RAM_CONFIG. This will drop all cells at a depth deeper than this, preventing back-pressure from reaching back into the switch fabric. The setting of this is a system level decision, preventing back-pressure prevents a failure or congestion on one card from affecting the performance of the fabric as a whole. On the other hand, using the back-pressure allows more multicast cells to be passed without the fear of dropping in the egress QRT. The high priority back-pressure bit is derived from the near-fullness of queue 8. The medium priority back-pressure bit is derived from the near-fullness of queue 9. The low priority backpressure bit is derived from the OR of the near-fullness of queues 10–15. Early Packet Discard, CLP-based dropping, and EFCI are all valid for multicast cells and are configured in the TX_CH_CONFIG word using the same bits as for multicast connections.

8. Conclusion

The invention has now been explained in accordance with specific embodiments, however many variations will be obvious to those skilled in the art. The invention should therefore not be limited except as provided

What is claimed is:

1. A method for routing a plurality of cells in a switch fabric, the switch fabric having a plurality of input and output ports, the method comprising:

forming input and output routing tables;

forming a list of channels adapted to supply the plurality of cells, each channel having a sequence number;

assigning a sequence number to each of the plurality of cells transmitted from the input routing table to the output routing table;

limiting to N the number of cells that the input routing table is adapted to transmit without receiving acknowledgment from the output routing table;

computing an expected sequence number for each transmitted cell;

transmitting a cell to an output port of the output routing table if the assigned sequence number and the expected sequence number for the cell match;

storing a cell present in the output routing table if the assigned sequence number of the cell is greater than the expected sequence number of the cell and is within a range defined by the expected sequence number and the expected sequence number plus N, wherein N is an integer and computing a new expected sequence number for a channel if the assigned sequence number of the cell neither matches the expected sequence number for the cell nor is within the range defined by the expected sequence number and the expected sequence number plus N.

2. The method of claim 1 further comprising:

not discarding the cell if the cell is stored in the output routing table; and discarding the cell if the cell is received by the output routing table and the output routing table completes a sequence of M cells, wherein all the M cells are discarded.

3. The method of claim 2 wherein both steps of not discarding and discarding are performed in accordance with an early packet discard algorithm.

* * * * *